United States Patent
Ruocco et al.

(10) Patent No.: US 11,643,534 B2
(45) Date of Patent: May 9, 2023

(54) POLYETHYLENE GLYCOL-BASED POLYMER PROCESSING AID MASTERBATCHES

(71) Applicant: ExxonMobil Chemical Patents Inc., Baytown, TX (US)

(72) Inventors: Nino Ruocco, Houston, TX (US); Michael A. Leaf, Baytown, TX (US); Danny Van Hoyweghen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 17/935,007

(22) Filed: Sep. 23, 2022

(65) Prior Publication Data

US 2023/0024578 A1 Jan. 26, 2023

Related U.S. Application Data

(60) Provisional application No. 63/367,425, filed on Jun. 30, 2022, provisional application No. 63/367,241, filed on Jun. 29, 2022, provisional application No. 63/366,678, filed on Jun. 20, 2022, provisional application No. 63/309,859, filed on Feb. 14, 2022, provisional application No. 63/309,871, filed on Feb. 14, 2022, provisional application No. 63/267,640, filed on Feb. 7, 2022, provisional application No. (Continued)

(51) Int. Cl.
C08L 23/08 (2006.01)
C08L 71/02 (2006.01)
C08J 5/18 (2006.01)

(52) U.S. Cl.
CPC ............. *C08L 23/0815* (2013.01); *C08J 5/18* (2013.01); *C08L 71/02* (2013.01); *C08J 2323/08* (2013.01); *C08L 2203/16* (2013.01); *C08L 2205/06* (2013.01); *C08L 2207/066* (2013.01)

(58) Field of Classification Search
CPC .. C08L 71/02; C08L 23/0815; C08G 2650/58
See application file for complete search history.

(56) References Cited

U.S. PATENT DOCUMENTS

| | | |
|---|---|---|
| 3,222,314 A | 12/1965 | Wolinski |
| 4,013,622 A | 3/1977 | DeJuneas et al. |
| 4,540,538 A | 9/1985 | Corwin et al. |

(Continued)

FOREIGN PATENT DOCUMENTS

| | | |
|---|---|---|
| CA | 2264463 A1 | 9/2000 |
| CN | 103772789 B | 4/2016 |

(Continued)

*Primary Examiner* — Mark S Kaucher
(74) *Attorney, Agent, or Firm* — ExxonMobil Chemical Patents Inc.-Law Department

(57) ABSTRACT

Provided herein are polymer compositions and methods of making them, including blending a polymer and a polyethylene glycol (PEG) masterbatch. The PEG masterbatch can include one or more PEGs each having molecular weight less than 40,000 g/mol. The polymer can be a $C_2$-$C_6$ olefin homopolymer or a copolymer of two or more $C_2$-$C_{20}$ α-olefins. The PEG masterbatch and resulting polymer composition is preferably free or substantially free of fluorine, including fluoropolymer-based PPAs.

18 Claims, 5 Drawing Sheets

Related U.S. Application Data

63/266,782, filed on Jan. 14, 2022, provisional application No. 63/261,908, filed on Sep. 30, 2021.

(56) References Cited

U.S. PATENT DOCUMENTS

| | | | |
|---|---|---|---|
| 4,855,360 A * | 8/1989 | Duchesne | C08L 23/02 525/154 |
| 5,015,693 A | 5/1991 | Duchesne et al. | |
| 5,550,193 A * | 8/1996 | Chiu | C08L 23/0815 524/400 |
| 6,294,604 B1 | 9/2001 | Focquet et al. | |
| 7,442,742 B1 | 10/2008 | Smink et al. | |
| 7,528,185 B2 | 5/2009 | Lee | |
| 8,178,479 B2 | 5/2012 | Cernohous | |
| 8,388,868 B2 | 3/2013 | Easter | |
| 8,455,580 B2 | 6/2013 | Sengupta et al. | |
| 8,552,136 B2 | 10/2013 | Papp et al. | |
| 8,728,370 B2 | 5/2014 | Vogt et al. | |
| 9,115,274 B2 | 8/2015 | Bates | |
| 9,187,629 B2 | 11/2015 | Adamczyk et al. | |
| 9,896,575 B2 | 2/2018 | Duchesne et al. | |
| 10,242,769 B2 | 3/2019 | Kohri et al. | |
| 10,544,293 B2 | 1/2020 | Kohri et al. | |
| 10,982,079 B2 | 4/2021 | Lavallee et al. | |
| 2003/0040695 A1 * | 2/2003 | Zhao | A61F 13/26 604/15 |
| 2005/0070644 A1 | 3/2005 | Tikuisis et al. | |
| 2006/0217490 A1 * | 9/2006 | Lee | C08L 23/06 525/240 |
| 2008/0132654 A1 | 6/2008 | Ho et al. | |
| 2008/0318065 A1 * | 12/2008 | Sherman | C09D 123/06 428/446 |
| 2009/0043012 A1 * | 2/2009 | Easter | C08L 23/0815 523/173 |
| 2014/0182882 A1 | 7/2014 | Adamczyk | |
| 2014/0242314 A1 | 8/2014 | Inn et al. | |
| 2015/0175785 A1 * | 6/2015 | Lavallee | C08K 5/34 524/99 |
| 2016/0145427 A1 * | 5/2016 | Eng | C08K 5/34926 252/403 |
| 2016/0229994 A1 * | 8/2016 | Lavallée | B29C 48/022 |
| 2017/0342245 A1 | 11/2017 | Lavallee et al. | |
| 2020/0325314 A1 | 10/2020 | Bergqvist et al. | |
| 2022/0112363 A1 | 4/2022 | Hamad et al. | |

FOREIGN PATENT DOCUMENTS

| | | |
|---|---|---|
| CN | 104558751 B1 | 6/2017 |
| CN | 107540920 A | 1/2018 |
| CN | 110317383 | 10/2019 |
| CN | 108481855 B | 7/2020 |
| CN | 112029173 A | 12/2020 |
| EP | 0217585 A2 | 4/1987 |
| JP | 2012009754 | 1/2012 |
| KR | 10-2020-0053903 | 5/2020 |
| KR | 10-2167728 | 10/2020 |
| WO | 1998-010928 | 3/1998 |
| WO | 2011-028206 | 3/2011 |
| WO | 2017-077455 | 5/2017 |
| WO | 2021/220134 A1 | 11/2021 |
| WO | 2022-076296 A1 | 4/2022 |
| WO | 2022-079601 A1 | 4/2022 |

* cited by examiner

POLYETHYLENE GLYCOL-BASED POLYMER PROCESSING AID MASTERBATCHES

CROSS-REFERENCED RELATED APPLICATIONS

This application claims the benefit of U.S. Provisional Application 63/261,908 filed Sep. 30, 2021 entitled "Fluorine-Free Polymer Processing Aids", and also claims the benefit of U.S. Provisional Application 63/266,782 filed Jan. 14, 2022 entitled "Fluorine-Free Polymer Processing Aids", and also claims the benefit of U.S. Provisional Application 63/267,640 filed Feb. 7, 2022 entitled "Fluorine-Free Polymer Processing Aids Including Polyethylene Glycols", and also claims the benefit of U.S. Provisional Application 63/309,859 filed Feb. 14, 2022 entitled "Fluorine-Free Polymer Processing Aids Including Polyethylene Glycols", and also claims the benefit of U.S. Provisional Application 63/309,871 filed Feb. 14, 2022 entitled "Fluorine-Free Polymer Processing Aid Blends", and also claims the benefit of U.S. Provisional Application 63/366,678 filed Jun. 20, 2022 entitled "Fluorine-Free Polymer Processing Aid Blends", and also claims the benefit of U.S. Provisional Application 63/367,241 filed Jun. 29, 2022 entitled "Polyethylene Glycol-Based Polymer Processing Aids", and also claims the benefit of U.S. Provisional Application 63/367,425 filed Jun. 30, 2022 entitled "Polyethylene Glycol-Based Polymer Processing Aid Masterbatches", the entireties of which are incorporated by reference herein.

FIELD

The present disclosure relates to additives for polyolefin polymers (such as polyethylene), as well as the polymers themselves, methods of making them, and articles made therefrom.

BACKGROUND

Polyolefin polymer compositions are in high demand for many applications, including various films (such as cast films, shrink films, and blown films), sheets, membranes such as geomembranes, sacks, pipes (e.g., polyethylene of raised temperature (PE-RT) pipes, utility pipes, and gas distribution pipes), roto-molded parts, blow-molded flexible bottles or other containers, and various other blow molded/extruded articles such as bottles, drums, jars, and other containers. These applications have been commonly made from, for example, polyethylene polymers.

Polyolefin polymers are most commonly produced and sold as pellets, formed in post-polymerization reactor finishing processes (such as extrusion of polymer product that is in an at least partially molten state, followed by pelletization). Additives are commonly blended into the polymer product as part of this finishing process, such that the polymer pellets comprise the polymer itself and one or more additives.

Common additives, particularly for polymers such as polyethylenes intended for use as films, sacks, and other similar articles, include polymer processing aids (PPAs), which help make the pellets easier to manipulate in downstream manufacturing processes (such as extrusion, rolling, blowing, casting, and the like). Adequate amounts of PPA, among other things, help eliminate melt fractures in films made from the polymer pellets. This is particularly so for polymer pellets exhibiting relatively higher viscosity in extrusion processes. Melt fracture is a mechanically-induced melt flow instability which occurs, e.g., at the exit of an extrusion die and typically in conditions of high shear rate. Pinhole, linear, and annular die geometries are among those that can induce melt fracture. There are different mechanical regimes that describe PE melt fracture, but all manifest as a very rough polymer surface which persists as the polymer crystallizes. Commonly in the blown film industry, a rough array of sharkskin like patterns develop on the film surface, often with a characteristic size from the mm to cm scale, and they depend on both the flow profile and rheology of the polyolefin polymer (e.g., polyethylene).

Melt fracture can adversely affect film properties, distort clarity, and reduce gauge uniformity. Thus, melt fracture-prone polymer grades, as noted, often rely on a PPA.

The most common PPAs are or include fluoropolymers (fluorine-containing polymers). It is, however, desired to find alternative PPAs that do not include fluoropolymers and/or fluorine, while maintaining the effectiveness of fluoropolymer-based PPAs in preventing melt fractures.

Some references of potential interest in this regard include: U.S. Pat. Nos. 10,982,079; 10,242,769; 10,544,293; 9,896,575; 9,187,629; 9,115,274; 8,552,136; 8,455,580; 8,728,370; 8,388,868; 8,178,479; 7,528,185; 7,442,742; 6,294,604; 5,015,693; and 4,540,538; U.S. Patent Publication Nos. 2005/0070644, 2008/0132654, 2014/0182882, 2014/0242314, 2015/0175785, 2017/0342245, 2020/0325314; as well as WO2020/146351; WO2011/028206, CN104558751, CN112029173, KR10-2020-0053903, CN110317383, JP2012009754A, WO2017/077455, CN108481855, CN103772789.

SUMMARY

The present disclosure relates to polymer compositions, their methods of manufacture, and articles including and/or made from the polymer compositions. In a particular focus, the polymer compositions may be polyolefin compositions, such as polyethylene compositions. The polymer compositions can also include a PPA that is free or substantially free of fluorine; and, similarly, the polymer compositions can be free or substantially free of fluorine. In this context, "substantially free" permits trace amounts (e.g., 10 ppm or less, preferably 1 ppm or less, such as 0.1 ppm or less) of fluorine, e.g., as an impurity, but well below the amount that would intentionally be included in a polymer composition via such additives (e.g., about 100 ppm of fluorine atoms by mass of polymer product in a typical case where such additives are included). In various embodiments, the polymer compositions can be, e.g., polymer pellets; a polymer melt (as would be formed in an extruder such as a compounding extruder); reactor-grade polymer granules and/or polymer slurries; or other form of polymer composition containing the PPA and optionally one or more other additives.

The present disclosure also relates to films and/or other end-use articles made from such polymer compositions, and in particular instances can relate to cast or blown films, preferably blown films. Thus, the polyolefin compositions (e.g., polymer pellets) of various embodiments, and/or films or other articles made therefrom (e.g., blown films), are themselves free or substantially free of fluorine (or, at a minimum, free or substantially free of fluorine-based PPA). A fluorine-based PPA, as used herein, is a polymer processing aid or other polymeric additive containing fluorine.

The present inventors have found that polyethylene glycol (PEG) can be an advantageous replacement of fluorine-based PPAs in polyolefin compositions. The PEG-based PPA therefore can comprise at least 80 wt % (on the basis of total mass of the PPA) PEG, more preferably at least 90 wt %, or at least 99 wt %, such as at least 99.9 or 99.99 wt %; or, the PPA can consist or consist essentially of the PEG. The PEG can have molecular weight less than 40,000 g/mol, such as within the range from 1,500 to 35,000 g/mol, such as 5,000 to 12,000 g/mol, or 5,000 to 20,000 g/mol.

It is also found, however, that these lower-molecular-weight PEG compositions can be difficult to handle (e.g., due to relatively lower melting points). Therefore, delivery systems and methods that include the PEG incorporated into a masterbatch make particularly good PEG-based PPA compositions. Therefore, in many embodiments, the PEG-based PPA composition comprises (or consists or consists essentially of) a PEG masterbatch. The PEG masterbatch comprises a carrier resin and one or more PEGs, each PEG having molecular weight less than 40,000 g/mol. The PEG masterbatch preferably has 1-50 wt % loading of PEG(s) in the masterbatch (on the basis of mass of the masterbatch). The carrier resin can be a polyolefin, such as a polyethylene homopolymers or copolymer, and preferably has melt index (MI) of 0.8 to 10.0 g/10 min. The PEG masterbatch can further comprise additional additives (e.g., antioxidants, UV stabilizers, catalyst neutralizers, or the like), and/or it can further comprise a PPA blend partner, such as a metal salt of a fatty acid (e.g., a zinc salt of fatty acid, such as zinc stearate). The PEG and PPA blend partner may be employed in the PEG masterbatch in amounts within the range from 30:70 to 70:30 (weight ratio of PEG:PPA blend partner).

Thus, the invention in some embodiments extends to methods for producing a polymer product, such methods including blending a PEG (or PEG masterbatch) with a polymer composition to form a polymer mixture, and forming the polymer mixture into a polymer product. The blending can be carried out as part of a finishing process (e.g., wherein the polymer composition is a reactor-grade polymer such as granules; and the polymer product comprises polymer pellets, providing a ready-to-use polymer product for making films or other polymeric articles). Or, the blending can be carried out as part of a process for forming polymeric articles such as films—for example, wherein the polymer composition is a finished polymer composition such as polymer pellets; and the polymer product comprises a polymeric article such as a film. Such processes highlight a more flexible approach, wherein polymer pellets or other finished polymer product without PPA are made ready for blown film or other article production through addition of the PEG-based PPA composition (e.g., PEG or PEG masterbatch).

The PEG masterbatch can be employed in amounts such that PEG is present in the polymer product in amounts ranging from about 200 ppm to about 15000 ppm, on the basis of mass of polymer in the polymer composition, more preferably about 250 or 300 ppm to about 2000 or 5000 ppm, or about 500 ppm to about 2500 ppm. As noted, other additives optionally can also be present in the polymer composition (e.g., antioxidants, stabilizers such as UV stabilizers, catalyst neutralizers, and other additives known in the art of polymerization). Preferably, however, the other additives do not contain any PEG of Mw 40,000 or greater, nor do they contain fluoropolymers or other fluorine-containing compositions, such that the final polymer composition is free or substantially free of fluorine and is free or substantially free of PEG having Mw 40,000 g/mol or greater. In this context, "substantially free" means that fluorine and PEG having Mw 40,000 g/mol or greater are not intentionally added to the polymer composition, but recognizes that these compounds can be present in very minor amounts as impurities or the like (e.g., amounts of 10 ppm or less each, preferably 1 ppm or less each, most preferably 1 ppb or less each, on basis of total mass of the polymer composition).

Moreover, the present disclosure in some aspects provides masterbatches of PEG (and optionally with other additives), capable of being deployed as a PPA composition. The masterbatch comprises a carrier resin and one or more PEGs each having Mw of less than 40,000 g/mol.

DETAILED DESCRIPTION

Definitions

Figure 1:
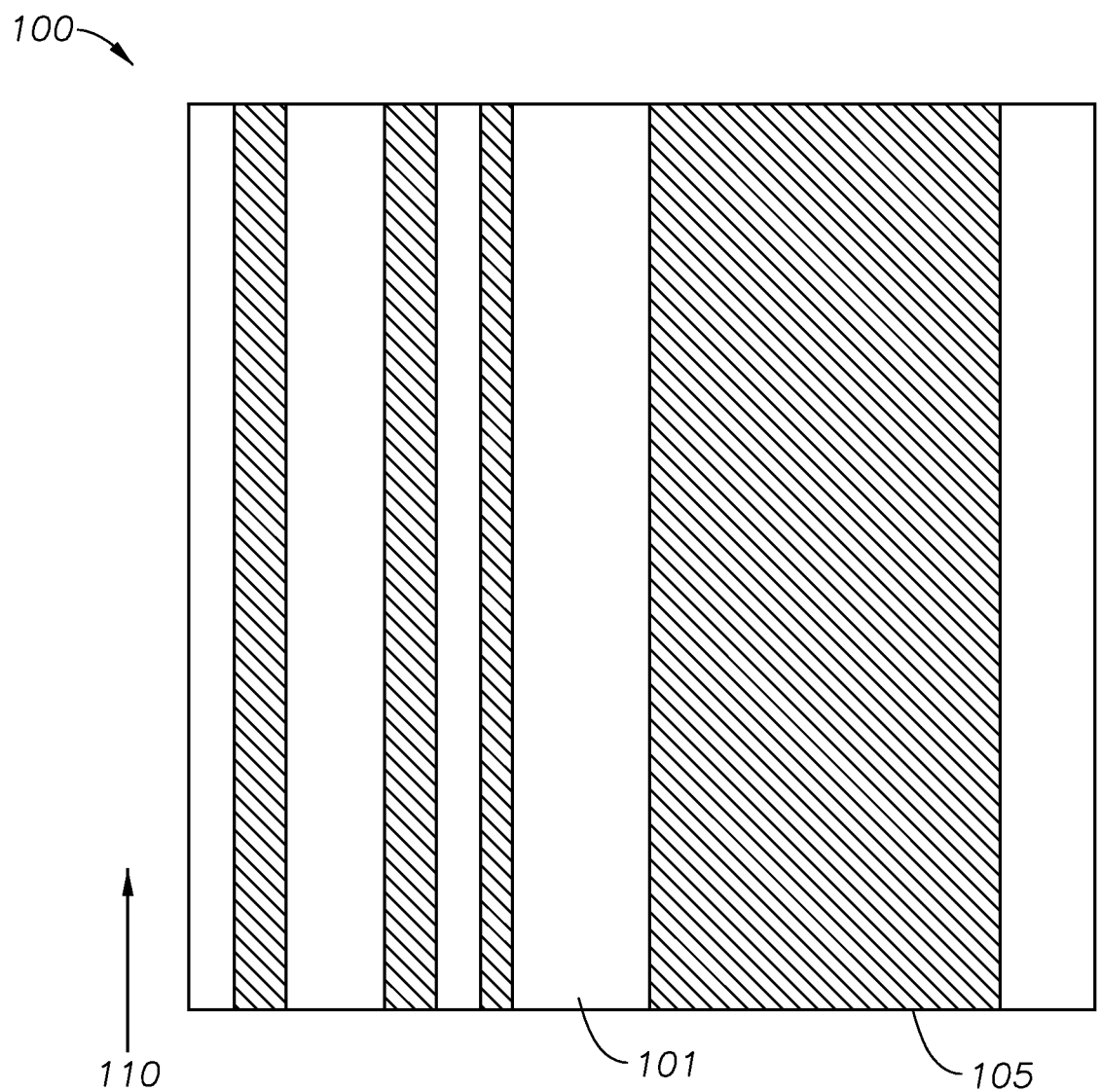
FIG. 1 is a schematic conceptually illustrating streaks of melt fractures and stripes of regions with melt fractures eliminated in a blown film during extrusion.

For the purposes of the present disclosure, various terms are defined as follows.

The term "polyethylene" refers to a polymer having at least 50 wt % ethylene-derived units, such as at least 70 wt % ethylene-derived units, such as at least 80 wt % ethylene-derived units, such as at least 90 wt % ethylene-derived units, or at least 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer"

is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "α-olefin" refers to an olefin having a terminal carbon-to-carbon double bond in the structure thereof $R^1R^2C=CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group. For the purposes of the present disclosure, ethylene shall be considered an α-olefin.

As used herein, the term "extruding" and grammatical variations thereof refer to processes that include forming a polymer and/or polymer blend into a melt, such as by heating and/or sheer forces, and then forcing the melt out of a die in a form or shape such as in a film, or in strands that are pelletized. Most any type of apparatus will be appropriate to effect extrusion such as a single or twin-screw extruder, or other melt-blending device as is known in the art and that can be fitted with a suitable die. It will also be appreciated that extrusion can take place as part of a polymerization process (in particular, in the finishing portion of such process) as part of forming polymer product (such as polymer pellets); or it can take place as part of the process for forming articles such as films from the polymer pellets (e.g., by at least partially melting the pellets and extruding through a die to form a sheet, especially when combined with blowing air such as in a blown film formation process). In the context of the present disclosure, extrusion in the finishing portion of polymerization processes may be referred to as compounding extrusion, and typically involves feeding additives plus additive-free (reactor grade) polymer to the extruder; while extrusion of polymer to make articles (e.g., extrusion of polymer pellets to make films) takes place conceptually "downstream" (e.g., at a later point, after polymer product has been formed including through compounding extrusion), and typically involves feeding optional additives plus additive-containing polymer to the extruder.

"Finishing" as used herein with reference to a polymerization process refers to post-polymerization reactor processing steps taken to form a finished polymer product, such as polymer pellets, with one example of a finishing process being the compounding extrusion just discussed. As the ordinarily skilled artisan will recognize, finishing is distinguished from, and conceptually takes place antecedent to, further processing of the finished polymer product into articles such as films.

A "PEG-based PPA composition" is a polymer processing aid composition containing at least 20 wt % polyethylene glycol (on basis of the total mass of the PPA composition).

A "polymer composition" refers to a composition containing a polymer. The polymer composition can be in any form. Some examples include: the form of a reactor grade (e.g., granules) containing the polymer; the form of a molten or at least partially molten composition containing the polymer and one or more additives undergoing or about to be undergoing the process of finishing (such as in the process of compounding extrusion), which is may be referred to as a pre; in the form of a finished polymer product such as polymer granules containing the polymer and any additives (such as PPA); or in the form of a finished polymer product such as polymer granules undergoing the process of mixing (e.g., via coextrusion, melt blending, or other processing) with additives, such as in the case of polymer being extruded to form film or other polymer-containing article.

Polymers

In various embodiments, polymer compositions include one or more polymers, preferably polyolefin polymers. Examples include homopolymers (e.g., homopolymers of a $C_2$ to $C_{10}$ α-olefin, preferably a $C_2$ to $C_6$ α-olefin). Particular examples of homopolymers include homopolyethylene and polypropylene (hPP). Taking for example homopolyethylene, such a polymer may be produced, e.g., by free radical polymerization in a high-pressure process, resulting typically in a highly branched ethylene homopolymer—often known as LDPE (low density polyethylene), having density less than 0.945 g/cm³, often 0.935 g/cm³ or less, such as within the range from 0.900, 0.905, or 0.910 g/cm³ to 0.920, 0.925, 0.927, 0.930, 0.935, or 0.945 g/cm³. Unless otherwise noted herein, all polymer density values are determined per ASTM D1505. Samples are molded under ASTM D4703-10a, procedure C, and conditioned under ASTM D618-08 (23°±2° C. and 50±10% relative humidity) for 40 hours before testing.

In another example, ethylene monomers may be polymerized via known gas, slurry, and/or solution phase polymerization (e.g., using catalysts such as chromium-based catalysts, or single-site catalysts such as Ziegler-Natta and/or metallocene catalysts, all of which are well known in the art of polymerization and not discussed further herein. Where a more highly linear ethylene homopolymer is produced (e.g., using gas or slurry phase polymerization with any of the above noted catalysts), it may be referred to as HDPE (high density polyethylene), typically having density 0.945 g/cm³ or greater, such as within the range from 0.945 to 0.970 g/cm³.

Yet further polymer examples include copolymers of two or more $C_2$ to $C_{40}$ α-olefins, such as $C_2$ to $C_{20}$ α-olefins, such as ethylene-α-olefin copolymers, or propylene-α-olefin copolymers (e.g., propylene-ethylene copolymers, or propylene-ethylene-diene terpolymers, sometimes known as EPDMs or PEDMs). Particular examples contemplated herein include copolymers of ethylene and one or more $C_3$ to $C_{20}$ α-olefin comonomers, such as $C_4$ to $C_{12}$ α-olefin comonomers (with 1-butene, 1-hexene, 1-octene, or mixtures of two or more of them being preferred in various embodiments). An ethylene copolymer (e.g., a copolymer of ethylene and one or more $C_3$ to $C_{20}$ α-olefins) can include ethylene-derived units in an amount of at least 80 wt %, or 85 wt %, such as at least 90, 93, 94, 95, or 96 wt % (for instance, in a range from a low of 80, 85, 90, 91, 92, 93, 94, 95, 96, or 97 wt %, to a high of 94, 95, 95.5, 96, 96.5, 97, 97.5, or 98 wt %, with ranges from any foregoing low value to any foregoing high value contemplated (provided the high is greater than the low) based on a total amount of ethylene-derived units and comonomer-derived units. For instance, the ethylene copolymer can include 94 or 95 wt % to 97 or 98 wt % ethylene-derived units based on the total amount of ethylene-derived units and comonomer-derived units. The balance of the copolymer (on the basis of ethylene-derived units and comonomer-derived units) is comprised of the comonomer-derived units. For example, comonomer units (e.g., $C_2$ to $C_{20}$ α-olefin-derived units, such as units derived from butene, hexene, and/or octene) may be present in the ethylene copolymer from a low of 2, 2.5, 3, 3.5, 4, 4.5, 5, or 6 wt %, to a high of 3, 4, 5, 6, 7, 8, 9, 10, 15, or 20 wt %, with ranges from any foregoing low to any foregoing high contemplated (provided the high is greater than the low value).

For ethylene-based, propylene-based, or other α-olefin based copolymers, several suitable comonomers were already noted, although in various embodiments, other α-olefin comonomers are contemplated. For example, the α-olefin comonomer can be linear or branched, and two or more comonomers can be used, if desired. Examples of suitable comonomers include linear $C_3$-$C_{20}$ α-olefins (such as butene, hexene, octene as already noted), and α-olefins having one or more $C_1$-$C_3$ alkyl branches, or an aryl group. Examples can include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. In some embodiments, comonomers include propylene, 1-butene, 1-pentene, 4-methyl-1-pentene, 1-hexene, 1-octene and styrene.

In particular embodiments, the polymer can comprise or can be an ethylene copolymer (per those described above). The ethylene copolymer can be produced in gas, slurry, or solution phase polymerization, and some particularly preferred ethylene copolymers can be produced in gas or slurry phase polymerization. A particular example is a linear-low density polyethylene (LLDPE), a copolymer of ethylene and one or more α-olefins polymerized in the presence of one or more single-site catalysts, such as one or more Ziegler-Natta catalysts, one or more metallocene catalysts, and combinations thereof. Such LLDPE can have density within the range from a low of 0.900, 0.905, 0.907, 0.910 g/cm³ to a high of 0.920, 0.925, 0.930, 0.935, 0.940, or 0.945 g/cm³. LLDPE can be distinguished from the above-mentioned LDPE in several respects, many of which are well known in the art, including the degree of branching (sometimes referred to more specifically as long-chain branching) in the produced polymer, noting that LLDPE has substantially less (often little, if any) long chain branching. In particular embodiments, the polymer of the polymer composition is or includes a metallocene-catalyzed LLDPE (mLLDPE). In yet other embodiments, the polymer of the polymer composition is or includes a Ziegler-Natta catalyzed LLDPE (or ZN-LLDPE).

Also or instead, density of the polymer may in some embodiments be within the range from 0.905 to 0.945 g/cm³, such as within the range from a low of any one of 0.905, 0.907, 0.908, 0.910, 0.911, 0.912, 0.913, 0.914, or 0.915 g/cm³ to a high of any one of 0.916, 0.917, 0.918, 0.919, 0.920, 0.924, 0.926, 0.930, 0.935, 0.940 or 0.945 g/cm³, with ranges from any foregoing low to any foregoing high contemplated herein (e.g., 0.910 to 0.925 or 0.935 g/cm³, such as 0.912 to 0.925, or 0.915 to 0.918 g/cm³). In yet other embodiments, the polymer may be of higher density (e.g., HDPE), having density within the range from 0.945 g/cm³ to 0.970 g/cm³.

Further, the rheology characteristics of the polymer may influence the preferred PEG-based PPA composition to be employed in the polymer composition to form a finished polymer product. In general, a PPA composition is preferably employed in a polymer having melt index (MI, or $I_2$, determined per ASTM D1238 at 190° C., 2.16 kg loading) of 5.0 g/10 min or less, preferably 2.5 g/10 min or less, such as within the range from 0.1, 0.2, or 0.5 g/10 min to 1.0, 1.2, 1.5, 2.0, 2.5, 3.0, 4.0, or 5.0 g/10 min (with ranges from any low to any high contemplated). Melt index ratio (MIR) is another polymer characteristic of potential interest in this regard. MIR is herein defined as the ratio of high load melt index (HLMI) (determined per ASTM D1238 at 190° C., 21.6 kg loading) to melt index, or HLMI/MI. Polymers of some embodiments can have MIR generally within the range from 10, 12, or 15 to 19, 20, 21, 22, 25, 27, 30, 35, 40, 45, 50, 60, 65, 70, 75, 80, 85, 90, 95, or 100. In particular embodiments, a PPA composition consisting or consisting essentially of PEG (or a PEG masterbatch, discussed below) is employed for polymers (especially ethylene-based polymers, such as copolymers of ethylene and a $C_3$ to $C_{12}$ alpha-olefin) having MIR greater than 20, such as within the range from greater than 20, or from 21, 22, 23, 25, 27, or 30, to a high of 35, 40, 45, 50, 60, 65, 70, 75, 80, 85, 90, 95, or 100. Optionally, MI in such polymers can be less than 1.5 g/10 min, such as 1.0 g/10 min or less (e.g., within the range from 0.1, 0.2, or 0.5 g/10 min to 1.0; or to any one of 1.1, 1.2, 1.3, 1.4, or less than 1.5 g/10 min).

On the other hand, a PPA blend partner (e.g., metal salt of a fatty acid, such as zinc stearate) is preferably added to the PPA composition for handling polymers having MIR of 20 or less, such as within the range from 5, 10, 12, or 15 to 17, 18, 19, or 20. Optionally, such polymers can also have melt index 1.0 g/10 min or greater, such as within the range from 1.0, 1.1, 1.2, 1.3, 1.4, 1.5, 1.6, 1.7, 1.8, 1.9, 2.0, 2.5, or 3.0 to 2.0, 2.2, 2.3, 2.5, 3.0, 3.5, 4.0, 4.5, or 5.0 g/10 min (with ranges from any foregoing low end to any foregoing high end contemplated, provided the high is greater than the low).

Furthermore, such polymers optionally can have a broad orthogonal composition distribution (BOCD), as described in, e.g., paragraphs 0045-0046, 51, and 53 of U.S. patent application Ser. No. 17/661,958, entitled "Blends of Recycled Resins with Metallocene-catalyzed Polyolefins" and filed May 4, 2022, which description is incorporated herein by reference. In particular, such polymers may be copolymers of ethylene and a $C_3$ to $C_{20}$ α-olefin, such as a $C_3$ to $C_{12}$ α-olefin such as 1-butene, 1-hexene, and/or 1-octene, having 80 to 99 wt % units derived from ethylene and the balance derived from the α-olefin comonomer(s). Any of various property quantifications can be associated with a BOCD nature, such as one or more of: (i) $T_{75}$-$T_{25}$ value from 5 to 10 (where $T_{25}$ is the temperature in degrees Celsius at which 25% of the eluted polymer is obtained and $T_{75}$ is the temperature in degrees Celsius at which 75% of the eluted polymer is obtained via temperature rising elution fractionation (TREF)); (ii) a composition distribution breadth index (CDBI) less than about 40%, such as less than about 35%; and (iii) a first peak and a second peak in a comonomer distribution analysis, wherein the first peak has a maximum at a log(MW) value of from 4.0 to 5.4 and a TREF elution temperature from 70° C. to 100° C., and the second peak has a maximum at a log(MW) value of 5.0 to 6.0 and a TREF elution temperature of 40° C. to 60° C. Paragraphs 37 and 44 of U.S. patent application Ser. No. 17/661,958 describe the CDBI and TREF methods for determining these properties. Also or instead, a copolymer can be determined to have BOCD nature through the methods described in paragraphs [0048]-[0054] and FIG. 2a of WO2022/120321, which description is incorporated herein by reference, especially regarding the description of FIG. 2a and the use of a gas phase chromatography (GPC)-derived plot of comonomer wt % vs. log(MW) to illustrate BOCD when such a plot exhibits positive slope, as quantified through the Comonomer Slope Index values described in the incorporated passages of WO2022/120321.

Thus, in some embodiments the present disclosure includes methods for producing two or more polymer compositions, comprising: (a) at a first time, producing a first polymer having melt index ratio (MIR) greater than 20 (and, optionally, melt index (MI) of 1.0 or less); (b) combining the first polymer with a PEG-based PPA composition comprising one or more PEGs and having substantially no metal salt of a fatty acid to form a first polymer product; (c) at a second time different from the first time, producing a second polymer having MIR 20 or less (and, optionally, melt index greater than or equal to 1.0 g/10 min; further optionally having BOCD); and (d) combining the second polymer with a PEG-based PPA composition comprising one or more PEGs and one or more salts of fatty acids to form a second polymer product. Conveniently, such methods could entail a continuous process as part of a production campaign; for instance, they may include continuously feeding to a compounding extruder a base PEG-based PPA composition comprising one or more PEGs and substantially no metal salt of fatty acid; for a first time period during the feeding, continuously co-feeding the first polymer to the compounding extruder, and obtaining the first polymer product; and for a second time period during the feeding (after the first time period), continuously adding one or more metal salts to the PEG-based PPA composition feed to the compounding extruder while continuously co-feeding the second polymer to the compounding extruder, and obtaining the second polymer product. The process could continue further with a third time period after the second, at the beginning of which, addition of the one or more metal salts to the PEG-based PPA composition feed is halted, such that feed of the PEG-based PPA composition having substantially no metal salts of fatty acids is resumed in a continuous feed to the compounding extruder, during which time a third polymer having MIR of greater than 20 (and optionally MI of 1.0 g/10 min or less) is continuously co-fed to the compounding extruder, and a third polymer product obtained. In this way, PPA blend partner is readily deployed only during time periods in which it is required for processing (e.g., finishing) of a polymer the rheology of which calls for the PPA blend partner, providing a tailored process and conserving resources.

The PEG-based polymer processing aids, including the PEG and PPA blend partner components, are discussed in more detail below.

PEG-Based Polymer Processing Aids and Suitable PEGs

The polymer compositions, as noted, also include a PEG-based PPA composition. The PEG-based PPA composition can comprise at least 20 wt % PEG, such as at least 30 wt % or at least 40 wt % PEG. In particular embodiments, the PEG-based PPA can consist of or consist essentially of PEG or a PEG masterbatch (where "consist essentially of", in this context, permits up to 1 wt %, more preferably 0.5 wt % or less, most preferably 0.1 wt % or less, of impurities, where the impurities preferably do not include fluorine or any fluorine-containing compound). In other embodiments, the PEG-based PPA composition can comprise PEG at loading of 20, 30, or 40 to 60, 70, 80, or 90 wt % (on the basis of total mass of PPA composition), and one or more PPA blend partners at a loading within a range from 10, 20, 30, or 40 wt % to 60, 70, or 80 wt % (on the basis of total mass of PPA composition, with ranges from any foregoing low end to any foregoing high end contemplated).

It is noted that PEG is a component in some known fluoropolymer-based PPAs (see, e.g., WO2020/146351) and higher-molecular weight PEG (often referred to as polyethylene oxide or PEO, see below for more details) has been suggested as one among other ingredients such as metal salts of particular acids or alkylsulfate, in other PPAs (see, e.g., US2017/0342245). However, the present inventors have found particular lower molecular weight varieties of polyethylene glycol are useful as PPAs, and for most polymers, the PEG can be deployed without other components, especially without fluorine-based components and/or inorganic components such as the aforementioned metal salts. Thus, a PPA of the present disclosure comprises at least 80 wt % PEG or PEG masterbatch, more preferably at least 90 wt % PEG or PEG masterbatch, such as at least 95 wt % or at least 99 wt % PEG or PEG masterbatch; alternatively the PPA may be said to consist or consist essentially of PEG or PEG masterbatch (where "consist essentially of" in this context means that other components are not intentionally included, but allows for trace amounts, e.g., 100 ppm or less, preferably 50 ppm or less, or even 10 or 1 ppm or less, of impurities, and further wherein such impurities do not include fluorine or fluorine-containing compounds). More generally, the present inventors have identified suitable processing conditions, suitable varieties of PEG (based, e.g., upon molecular weight), and suitable loadings of PEG-based PPA compositions in polymer compositions, that individually or collectively can overcome many of the challenges of incorporating PEG into a polymer composition. For instance, PEG has a substantially lower melting temperature than many polymers (e.g., polyethylene homopolymers or copolymers), and therefore can start beading up during attempts to mix this ingredient with such polymers having higher melting point than PEG. This phenomenon can be mitigated or exacerbated depending upon the size (molecular weight) of the PEG, and/or the desired loading of the PEG-based PPA composition in the polymer; and can affect proper mixing. Furthermore, as a generally hydrophilic compound, PEG's incorporation into generally more hydrophobic polymer compositions can present some challenges, requiring close examination of suitable molecular weight ranges, amounts, and methods of incorporation of PEG-based PPAs into a polymer composition, particularly where the PEG-based PPA composition comprises a large amount of PEG or PEG masterbatch (80 wt % or more, 90 wt % or more, 99 wt % or more, or substantially all, on basis of mass of the PPA composition).

As used herein, polyethylene glycol or PEG refers to a polymer expressed as $H-(O-CH_2-CH_2)_n-OH$, where n represents the number of times the $O-CH_2-CH_2$ (oxyethylene) moiety is repeated; n can range widely, because PEG comes in a wide variety of molecular weights. For instance, n can be about 33 for lower-molecular weight polyethylene glycols (~1500 g/mol), ranging up to about 227 for higher molecular weight polyethylene glycols (~10,000 g/mol) such as about 454 for ~20,000 g/mol molecular-weight PEG; and 908 for ~40,000 molecular-weight PEG; and even higher for higher-molecular-weight PEG varieties.

It is also noted that PEG can equivalently be referred to as polyethylene oxide (PEO) or polyoxyethylene (POE). Sometimes in industry parlance, PEG is the nomenclature used for relatively lower molecular weight varieties (e.g., molecular weight 20,000 g/mol or less), while polyethylene oxide or PEO is used for higher-molecular-weight varieties (e.g., above 20,000 g/mol). However, for purposes of the present application, references to polyethylene glycol or PEG should not, alone, be taken to imply a particular molecular weight range, except where a molecular weight range is explicitly stated. That is, the present application may use the terms polyethylene glycol or PEG to refer to a polymer having structure $H-(O-CH_2-CH_2)_n-OH$ with n such that the polymer's molecular weight is less than 20,000 g/mol, and it may also use the terms polyethylene glycol or PEG to refer to such a polymer with n such that the polymer's molecular weight is greater than 20,000 g/mol, such as within the range from 20,000 to 40,000 g/mol.

PEG "molecular weight" as used herein refers to weight-average molecular weight (Mw) as determined by gel permeation chromatography (GPC), and PEG "molecular weight distribution" or MWD refers to the ratio of Mw to number-average molecular weight (Mn), i.e., Mw/Mn. PEG compositions for use in PPAs may advantageously have narrow MWD, such as within the range from a low of any one of about 1.0, 1.1, 1.2, 1.3, 1.4, or 1.5 to a high of any one of about 1.1, 1.2, 1.3, 1.4, 1.5, 1.6, 1.7, 1.8, 1.9, 2.0, 2.5, or 3.0, with ranges from any foregoing low end to any foregoing high end contemplated, provided the high end is greater than the low end (e.g., 1.0 to 2.0, or 1.0 to 1.5, such as 1.0 to 1.2 or even 1.0 to 1.1). For instance, PEG compositions having MWD of about 1 to 1.1 or 1.2 may be particularly useful. However, obtaining such a uniform length of polymer chains (i.e., narrow MWD) can be expensive; thus, commercially available PEG compositions might have broader MWD values (e.g., ranging from 1 to 3, 4, 5, or even greater). Such PEG compositions are therefore also within the scope of the invention. These PEG compositions can still suitably be employed as PPAs, potentially (but not necessarily) compensating by increasing the PEG loading for such broader-MWD PEGs (e.g., 700-1400 ppm, as compared to loadings as low as 400-700 ppm for narrower-MWD PEGs). PEG-based PPA loading is discussed in more detail below.

In embodiments employing narrow MWD PEG, Mw values for PEG will commonly be in relatively close agreement with Mn (e.g., within 10%); regardless, however, where differences between the two (Mw and Mn) exist, Mw should control as the preferred "molecular weight" measurement for purposes of the present disclosure. It is also noted that many commercial PEG compounds include a nominal molecular weight (e.g., "PEG 3K" or "PEG 10K" indicating nominal 3,000 g/mol and 10,000 g/mol molecular weights, respectively). Again, Mw of the PEG should control over any contrary nominal indicator.

Polyethylene glycols suitable for use in PEG-based PPAs herein generally can include PEG of a variety of molecular weights, potentially including PEG having Mw ranging from as low as 500 g/mol to as high as 200,000 g/mol, such as from a low of any one of 500, 600, 700, 800, 900, 1000, 3000, 5000, 7000, or 7500 g/mol to a high of 40000, 50000, 60000, 75000, 80000, 90000, 100000, 125000, 150000, 175000, or 200000 g/mol, with ranges from any low end to any high end contemplated.

In certain embodiments, however, particularly preferred PEGs are those having molecular weight less than 40,000 g/mol; such as within the range from a low of any one of 500, 600, 700, 800, 900, 1000, 1500, 2000, 2500, 3000, 3500, 4000, 4500, 5000, 5500, 6000, 7000, 8000, 8500, 9000, 9500, 10000, 12500, and 15000 g/mol to a high of any one of 7000, 7500, 8000, 8500, 9000, 9500, 10000, 10500, 11000, 11500, 12000, 12500, 15000, 20000, 22000, 25000, 30000, 35000, 39000, and 39500 g/mol, provided the high end is greater than the low end, and with ranges from any foregoing low end to any foregoing high end generally contemplated (e.g., 1,500 to 35,000 g/mol, or 5,000 to 20,000 g/mol, such as 5,000 to 12,000 g/mol or 6,000 to 12,000 g/mol). Particular higher or lower sub-ranges may also be suitable (e.g., PEG having Mw of 1,500 to 5,500 g/mol; or PEG having Mw of 5,000 to 12,000 g/mol; or PEG having Mw of 10,000 to 20,000 g/mol; or PEG having Mw of 15,000 to 25,000 g/mol; or PEG having Mw of 25,000 to 35,000 g/mol).

Further, it is also contemplated that blends of multiple of the aforementioned PEG compounds could form a suitable PPA. For instance, a PEG-based PPA can comprise at least 90 wt %, preferably at least 99 wt %, of a blend of two or more polyethylene glycols, for instance any two or more of: a first PEG having molecular weight within the range from 3,000 to 7,000 g/mol; a second PEG having molecular weight within the range from 5,000 to 12,000 g/mol; a third PEG having molecular weight within the range from 10,000 to 20,000 g/mol; and a fourth PEG having molecular weight within the range from 20,000 to 40,000 g/mol, provided that each of the first, second, third, and fourth PEG of such blends have different molecular weights from the other polyethylene glycol(s) of those blends. And, in some embodiments, a higher-molecular weight PEG could be included in such blend (e.g., one or more PEGs having molecular weight greater than 40,000 g/mol).

However, as noted, it is contemplated that PEG-based PPA compositions of many embodiments as described herein do not include polyethylene glycol (or polyethylene oxide) having molecular weight greater than 40,000 g/mol. That is, it is preferred that all or substantially all polyethylene glycol of the polymer compositions has molecular weight less than 40,000 g/mol; such as less than 35,000 g/mol, or less than 33,000 g/mol, or less than 22,500 g/mol, or less than 20,000 g/mol, or less than 12,000 g/mol, such as less than 10,000 g/mol. In this context, "substantially all" means that minor amounts (50 ppm or less, more preferably 10 ppm or less, such as 1 ppm or less) of higher-molecular weight PEG could be included while not losing the effect of including predominantly the lower-molecular-weight PEGs described herein. Put equivalently, the PEG having molecular weight greater than 40,000 g/mol is absent or substantially absent from the polymer compositions. It is believed that the focus on lower molecular-weight PEG enables generally lower loadings of the PEG-based PPA to achieve the desired elimination of melt fractures across most grades of polymer that might experience melt fracture when formed into blown films. Similarly, lower molecular-weight PEG is believed to diffuse faster to the surface of polymer material being extruded in, e.g., blown film processes, as compared to higher molecular weight varieties of PEG; therefore, the lower molecular-weight PEG varieties will typically lead to faster elimination of melt fracture in blown films (and therefore lower off-spec production). However, it is nonetheless contemplated that higher-molecular weight PEG (e.g., Mw>40,000 g/mol) may be appropriate in some cases for certain polymer grades, despite the above-noted advantages of lower-molecular weight PEG; hence the contemplation that such higher-molecular weight PEGs may be included in polymer compositions that are still within the spirit and scope of some embodiments of the present invention.

Commercially available examples of suitable polyethylene glycols, especially those of lower molecular weight, include Pluriol® E 1500; Pluriol® E 3400; Pluriol® E 4000; Pluriol® E 6000; Pluriol® E 8000; and Pluriol® E 9000 polyethylene glycols available from BASF (where the numbers represent nominal molecular weights of the PEG); and also include Carbowax™ 8000, Carbowax™ Sentry™ 8000 NF EP available from Dow.

Measuring Moments of Molecular Weight

Unless otherwise indicated, the distribution and the moments of molecular weight are determined by using Agilent 1260 Infinity II Multi-Detector GPC/SEC System equipped with multiple in-series connected detectors including a differential refractive index (DRI) detector, a viscometer detector, a two-angle light scattering (LS) detector and a UV diode array detector. Two Agilent PLgel 5-μm Mixed-C columns plus a guard column are used to provide polymer separation. THF solvent from Sigma-Aldrich or equivalent with 250 ppm of antioxidant butylated hydroxytoluene (BHT) is used as the mobile phase. The nominal flow rate is 1.0 ml/min and the nominal injection volume is 25 μL. The whole system including columns, detectors and tubings operates at 40° C. The column calibration was performed by using twenty-three polystyrene narrow standards ranging from 200 to 4,000,000 g/mole.

The Agilent Multi-Detector GPC Data Analysis Software is used to process data from any combination of DRI, light scattering and viscometer detectors to obtain information about polymer properties. Here, the light scattering MW is calculated by combining the concentration measured by DRI and the Rayleigh ratio measured by LS in each elution volume slice plus the detector calibration constants and polymer parameters such as refractive index increment (dn/dc). For the poly (ethylene glycol) samples used in the patent, the dn/dc is determined to be around 0.07 ml/g in THF solvent.

Amounts of PEG-Based PPA and Polymer Properties

The polyethylene glycol (or PEG-based PPA) can be deployed in the polymer composition in amounts of at least 200 ppm, such as at least 250 ppm, at least 300 ppm, at least 400 ppm, at least 500 ppm, or at least 600 ppm. For instance, it can be deployed in an amount within a range from a low of any one of 200, 250, 300, 350, 400, 450, 500, 550, 600, 650, 700, 750, 800, 900, 950, 1000, 1100, 1200, 1250, and 1500 ppm to a high of any one of 400, 500, 600, 700, 800, 900, 1000, 1100, 1200, 1300, 1400, 1500, 1600, 1700, 1800, 1900, 2000, 2500, 3000, 3500, 4000, 4500, 5000, 7500, 10000, 12500, and 15000 ppm, with ranges from any foregoing low to any foregoing high contemplated, provided the high end is greater than the low end (e.g., 300 to 15,000 ppm, such as 300 to 2,000 ppm; or 500 to 1500 ppm, such as 500 to 1200 ppm, or 600 to 1200 ppm). The ppm values can apply for either polyethylene glycol included in a polymer composition; or to PEG-based PPA composition included in the polymer composition, in various embodiments. Further, the ppm values recited herein for polyethylene glycol (or PEG-based PPA composition), as well as any other additives described herein, are all based on mass of the polymer composition (i.e., inclusive of polymer plus PPA, as well as any and all other additives in the polymer composition), unless otherwise specifically noted. Amounts of PPA in a polymer composition can most readily be determined using mass balance principles (e.g., PPA amount is determined as mass of PPA added to a polymer composition, divided by (mass of PPA plus mass of polymer plus mass of any other additives blended together to form the polymer composition)). NMR analysis could be used to determine the PPA content of an already-mixed polymer composition (e.g., polymer pellet(s) comprising the polymer and PPA), but where there is a discrepancy between the two methods (mass balance and NMR), the mass balance method should be used.

Furthermore, the present inventors have found surprisingly that PEG molecular weight can affect optimal loading amounts. Specifically, higher-molecular weight PEG eliminates melt fracture faster at lower loading as compared to lower-molecular weight PEG; and at the same time, higher loading of higher-molecular weight PEG can in fact lead to slower melt fraction elimination in films made using the polymer composition comprising the PEG-based PPA. On the other hand, significantly lower-molecular weight PEG variants can require higher loadings, while lower loadings of these PEG varieties can take excessively long to eliminate melt fracture (or fail to eliminate it entirely). The cutoff between these opposing trends appears to take place somewhere in the range of 7,500-11,000 g/mol molecular weight, with the 7,500-11,000 g/mol region representing a transition area where neither trend is excessively pronounced. Thus, PEG having Mw less than 7,500 g/mol is in general best employed at higher loading (e.g., 1000, 1100, or 1200 ppm to 2000 or more ppm), while PEG having Mw 11,000 g/mol or greater is better employed at moderate or low loading (e.g., 200 to 500, 600, 700, 800, 900, 1000, 1100, or 1200 ppm, on basis of mass of the polymer). The picture is somewhat further complicated, however, so the solution is not necessarily as simple as preferentially selecting higher molecular-weight PEG. In particular, as described herein, certain grades of polymers can require higher loading of PEG (regardless of molecular weight) as polymer rheology also affects performance of PEG in eliminating melt fracture from blown films made from the polymer. Therefore, employing higher molecular-weight PEG can lead to the pitfall of grade-specific loading variations, where accidentally loading too much PEG can detrimentally impact performance in some cases while improving it in others.

Applying these trends generally, we first see a set of embodiments employing lower molecular-weight PEG combined with relatively higher loading levels. That is, the polymer composition of some embodiments comprise PEG or a PEG masterbatch (or, more generally, a PEG-based PPA composition) in which the PEG(s) of the polymer composition has/have Mw less than 7,500 g/mol (e.g., within the range from 95 g/mol to less than 7,500 g/mol, such as from 95, 100, 500, or 600 g/mol to 1000, 3000, 4000, 5000, 6000, 7000, 7250, or less than 7500 g/mol); and further in which the total amount of PEG in the polymer composition is within the range from a low of any one of 800, 850, 900, 950, or 1000 ppm to a high of any one of 1200, 1250, 1300, 1400, 1500, 1600, 1700, 1800, 1900, 2000, 2500, 3000, 3500, 4000, 4500, or 5000 ppm, with ranges from any foregoing low end to any foregoing high end also contemplated (e.g., 800 or 900 ppm to 2000 ppm, such as 950 ppm to 1700 ppm or 1000 ppm to 1500 ppm).

Second, is a set of embodiments employing relatively higher molecular-weight PEG combined with relatively lower loading levels. That is, the polymer composition can comprise PEG (or a PEG-based PPA) in which the PEG(s) of the polymer composition has/have Mw greater than 11,000 g/mol (such as within the range from greater than 11,000 g/mol to 35,000 or 40,000 g/mol, such as from a low end of any one of >11000, 11500, 12000, 12500, or 14000, to a high end of any one of 15000, 16000, 17500, 20000, 25000, 30000, 35000, or 40000 g/mol); and further in which the total amount of PEG in the polymer composition is within the range from a low of any one of 200, 250, or 300 ppm to a high of 300, 350, 400, 425, 450, 500, 600, 700, 750, 800, 1000, or 1100 ppm). Thus, a particular example is shown wherein the PEG(s) of the polymer composition have Mw within the range from 11000 to 20000 g/mol, and the total amount of PEG in the polymer composition is within the range from 200 to 800 ppm.

Moreover, as noted, the preferred PEG loading ranges may further need to be tailored based upon the properties of the polymer to which the PEG-based PPA composition is deployed, and in particular the rheological properties of the polymer. For instance, a polymer (e.g., a metallocene catalyzed linear low density ethylene copolymer) having lower MI and/or higher MIR may call for a higher loading of PEG—even of the higher-Mw varieties of PEG just discussed. For instance, where MI is less than 0.45 g/10 min (190° C., 2.18 kg) (and optionally further where MIR is greater than 30), loadings of 700 ppm or higher, even up to 1000 or 1100 ppm, even of a higher-Mw variety PEG, may be required.

Given the complexity of encountering potential diminishing returns in melt fracture elimination at higher PEG loadings for higher-Mw PEG varieties in some polymers, while requiring higher PEG loadings for other polymers (e.g., of the low MI variety), some embodiments herein emphasize simplicity, in particular by targeting a PEG having Mw in the middle range of the above-observed phenomenon (e.g., Mw within the range from 7000 or 7500 to 11000 g/mol, such as from 7500 to 9000 g/mol or from 9000 to 11000 g/mol). This enables a robust tailoring of PEG loading to the polymer, while at the same time avoiding the concern of substantial loss in performance when moving to higher loadings, as is sometimes observed with higher molecular-weight PEG.

A similar benefit of simplicity can be achieved with lower-Mw PEG varieties of some of the embodiments mentioned above (that is, increased loading tends to result in increased performance, without having to account as strictly for the polymer rheology). And, while higher-Mw PEG varieties of other embodiments mentioned above may introduce some added complexity in balancing against polymer rheology, they can still bring their own substantial benefits in the form of generally lower required loadings. Accordingly, the present disclosure in general encompasses all such classes of PEG with their varying benefits; the skilled artisan with the benefit of the present disclosure will readily be able to select the most suitable PEG varieties from among these for a given desired PPA.

PPA Blend Partners

Another avenue exists to address discrepancies that may be encountered when handling polymers of different rheology. As noted previously, it is found in particular that a PPA blend partner, such as a metal salt of a fatty acid, can be a useful addition to PEG in the PEG-based PPA composition when deploying the PPA composition in a polymer composition having MIR of 20 or less (such as 17 or less), and, optionally, MI of 1.0 g/10 min or greater (such as 1.25 or greater, or 1.5 or greater), and further optionally having a broad orthogonal composition distribution (in the case of, e.g., ethylene copolymers). Such a blend partner can be a particularly advantageous addition to PEG (and in particular, PEG having Mw within the range from 7500 to 11000 g/mol). Further, the blend partner may be included such that the weight ratio of PEG:blend partner in the PEG-based PPA composition (and thus in the polymer composition) is within the range from 30:70 to 70:30, preferably 40:60 to 60:40; such as at a 1:1 (50:50) ratio.

It is further noted that when a PPA blend partner is employed, the loading of PEG in the PEG-based PPA composition (and consequently in the polymer composition) can advantageously be reduced. For instance where 1000 ppm of PEG is used in a PEG-based PPA composition in the absence of a PPA blend partner, adding 500 ppm of PPA blend partner may concomitantly permit using only 500 ppm of PEG. Thus, in some cases, addition of PPA blend partner can be such that it replaces PEG at a 1:1 ratio (that is, for every 1 ppm of PPA blend partner added to a PEG-based PPA composition, the amount of PEG in the PPA composition can be reduced by 1 ppm), although it is contemplated that a 1:1 replacement ratio is not necessarily always required. More generally, where a PPA blend partner is employed, the PEG-based PPA composition can comprise each of PEG and the PPA blend partner in an amount within the range from a low of any one of 200, 250, 300, 350, 400, 450, or 500 ppm to a high of any one of 1000, 1500, 2000, 2500, 5000, 7500, 10000 or 15000 ppm, and further such that weight ratios of these components (PEG and PPA blend partner) are within the ranges previously described.

Preferred PPA blend partners, as noted, include metal salts of fatty acids. Fatty acids, as used herein, refer to carboxylic acid (formula R*—COOH, where R is alkyl or alkenyl), wherein R* is $C_8$ or greater (meaning the alkyl or alkenyl group comprises at least 4 carbon atoms). Preferably, R* is an aliphatic carbon chain having at least 4 carbons, such as at least 6 or at least 8 carbon atoms. It can be saturated or unsaturated (and, where unsaturated, can have one or more unsaturations). Examples include the following, where R*'s value is denoted as saturated carbon chains unless otherwise specifically noted to have one or more unsaturations: caprylic acid (where R* is $C_7$), capric acid (R* is $C_9$), lauric acid (R* is $C_{11}$), myristic acid (R* is $C_{13}$), palmitic acid (R* is $C_{15}$), oleic acid (R* is $C_{17}$, with a monounsaturation), stearic acid (R* is $C_{17}$), arachidic acid (R* is $C_{19}$), arachidonic acid (R* is $C_{19}$ with multiple unsaturations), erucic acid (R* is $C_{21}$, with a monounsaturation), behenic acid (R* is $C_{21}$), lignoceric acid (R* is $C_{23}$), and cerotic acid (R* is $C_{23}$).

A variety of suitable metals for forming a salt with the fatty acid are contemplated, including those of Groups 1 or 2 of the Periodic Table of the Elements (e.g., lithium, sodium, potassium, beryllium, magnesium, calcium). Also contemplated are metals with different valence such as aluminum and zinc.

Metal salts of particular interest include metal stearates, such as zinc stearate (although also contemplated are stearates of any other metal noted above). Zinc stearate can be of particular interest because of its common use in polymer compositions already, although it has not heretofore been used as such a major blend component in a fluorine-free PPA, and not in blends with surfactant and/or lower molecular-weight PEG as discussed above.

Along these lines, it is also noted that US2017/0342245 (referenced above) describes the use of zinc stearate (or other metal salts of various acids) as a thermal stabilizer for very high-molecular weight PEG compounds, as polymer processing additives. However, as also previously noted, that disclosure focuses on requiring high-molecular weight PEG in its compositions; and furthermore the reported amounts of zinc stearate, when used with PEG, are extremely small in comparison to the PEG (e.g., ratios of 3:100 zinc stearate:PEG), in contrast with the present findings that zinc stearate (or other metal salt of a fatty acid), when present in the blend, is preferably present at much higher levels (e.g., ratios of 30:70 to 70:30, such as 1:1, as discussed above).

Finally, other compounds may be suitable PPA blend partners. For example, polysorbates have shown promise as fluorine-free PPA compounds, particularly when blended with PEG. More generally, these compounds belong to a class of compounds comprising sorbitan esters, comprising an apolar carboxylic acid (a "lipophilic tail") attached by ester linkage to a polar sorbitan group (the "hydrophilic head" of such molecules). Also of interest are polyoxyethylene derivatives of sorbitan esters, which include a plurality of polyoxyethylene oligomers chemically substituted onto the sorbitan group. These polyoxyethylene derivatives of sorbitan esters may also be referred to as polysorbates.

More particularly, the polyoxyethylene derivative of sorbitan ester (also referred to as a polysorbate) can take the form of Formula (I):

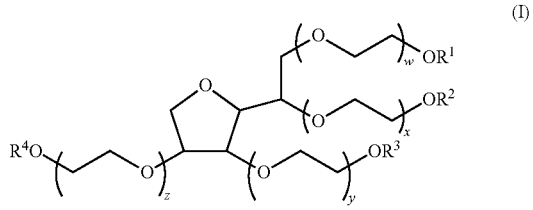

(I)

where: one of $R^1$-$R^4$ is a straight chain fatty acid moiety, and the other three of $R^1$-$R^4$ are each hydrogen; and w, x, y, and z are integers such that $10 \leq w+x+y+z \leq 40$; preferably $15 \leq w+x+y+z \leq 25$; more preferably $w+x+y+z=20$. The straight chain fatty acid moiety is preferably of the formula $(C=O)(CH_2)_a CH_3$, where a is an integer between 10 and 25 (inclusive), preferably between 12 and 18 (inclusive), although the fatty acid moiety may instead include a double-bond along the hydrocarbon chain (that is, it may include a monounsaturation), such that the formula is $(C=O)(CH_2)_b (CH)=(CH)(CH_2)_c CH_3$, where b and c are each integers and b+c add to an integer between 8 and 23 (inclusive), preferably between 10 and 16 (inclusive). The skilled artisan will further recognize that the hydrocarbon chain may include two or more unsaturations in alternate embodiments, although it is preferred to maintain unsaturations at 4 or less, more preferably 3 or less, most preferably 0, 1, or 2 (e.g., to minimize potential for oxidation of the surfactant, thereby maximizing thermal stability).

Specific examples of polysorbates include polysorbate 20 (polyoxyethylene (20) sorbitan monolaurate); polysorbate 40 (polyoxyethylene (20) sorbitan monopalmitate); polysorbate 60 (polyoxyethylene (20) sorbitan monostearate); and polysorbate 80 (polyoxyethylene (20) sorbitan monooleate). The 20, 40, 60, and 80 following "polysorbate" indicate the type of fatty acid moiety (the "lipophilic tail" of the molecule) appended to the polyoxyethylene sorbitan moiety (the "hydrophilic head" of the molecule): 20 is monolaurate, 40 is monopalmitate, 60 is monostearate, and 80 is monooleate (an example of a mono-unsaturated fatty acid moiety). The "polysorbate #" names assume 20 oxyethylene moieties [that is, —$(CH_2CH_2O)$—] appended to the sorbate. The alternate detailed names (e.g., "polyoxyethylene (20) sorbitan monostearate") indicate the number of oxyethylene moieties substituted on the sorbitan (20) and the fatty acid moiety appended to one of those moieties (mono stearate).

In certain embodiments, the surfactant can be or can comprise one or more of polysorbate 20, polysorbate 40, polysorbate 60, and/or polysorbate 80. For instance, the surfactant can be or can comprise polysorbate 60.

Commercially available examples include Avapol™ 60K from Avatar Corporation (polysorbate 60); Tween™ 20 detergent from Sigma-Aldrich or Tween™ 20 Surfact-Amps detergent solution from Thermo Scientific™; and Tween™ 40 viscous liquid from Sigma-Aldrich (also known as food additive number E434 in the European Union).

Also or instead, a surfactant that is a variant of the particular polysorbates just described may be employed. For example, referring again to Formula I, two, three, or all of $R^1$-$R^4$ can each be a straight chain fatty acid moiety (with the remainder of $R^1$-$R^4$, if any, being hydrogen). An example of this class of compound includes polyoxyethylene sorbitan tristrearate, in which three of $R^1$ to $R^4$ are the fatty acid moiety stearate, and the other of $R^1$ to $R^4$ is hydrogen.

Finally, it is reiterated that in other embodiments, sorbitan esters may be employed in a polymer composition as a PPA blend partner. Referring to Formula (I), w, x, y, and z would each be 0 (meaning no oxyethylene moieties are present). An example of such a compound is sorbitan tristearate, in which x, w, y, and z are each 0; three of $R^1$ to $R^4$ are the fatty acid moiety stearate, and the other of $R^1$ to $R^4$ is hydrogen.

PEG Masterbatches

Relatively lower-molecular weight PEG (e.g., Mw of 40,000 g/mol or less, such as 20,000 g/mol or less) can present some handling challenges due to lower melting points; however, these are readily overcome by deploying the PEG as a PEG masterbatch where necessary for better handling (e.g., for delivery as a solid additive to compounding extruder in a polymer finishing process). Such PEG masterbatches comprise PEG and a carrier resin. In general, a PEG masterbatch can be used in place of PEG in any PEG-based PPA composition described herein, such that the equivalent final loading of PEG in the PEG-based PPA composition (and thus, loading of PEG in the polymer composition) is maintained. Thus, a PEG masterbatch having 4 wt % PEG loading can be deployed at 25,000 ppm (2.5 wt %) in a polymer composition to target 1000 ppm loading of PEG in the polymer composition. The ordinarily skilled artisan will readily be able to recognize PEG masterbatch loading required to achieve desired overall PEG loading in the polymer composition in accordance with the description above of preferred PEG loadings.

Furthermore, as just noted, the PEG masterbatch comprises lower-molecular weight PEG. Thus, preferred PEG molecular weight limits as discussed previously apply equally to embodiments in which a PEG masterbatch is employed (e.g., such that all PEG in the PEG masterbatch, and thus all PEG in the polymer composition, has Mw less than 40,000 g/mol; such as less than 35,000 g/mol, or less than 33,000 g/mol, or less than 22,500 g/mol, or less than 20,000 g/mol, or less than 12,000 g/mol, such as less than 10,000 g/mol). And, PEG molecular weight may preferably be within the range from 7500 to 11000 g/mol as just discussed in connection with a simplified PEG deployment strategy.

The carrier resin can be any suitable olefinic homopolymers or copolymer, although preferred carrier resins will be generally compatible with the polymers targeted in a given production campaign. That is, for a production campaign of ethylene-based polymers, an ethylene-based carrier resin (e.g., having at least 50 wt % units derived from ethylene) is preferred; while for a production campaign of propylene-based copolymers, such as propylene-ethylene elastomers, a propylene-ethylene copolymer carrier resin, or other propylene-based carrier resin (having at least 50 wt % units derived from propylene) would be preferred. Moreover, the carrier resin is preferably relatively easy to process, i.e., having melt index (MI, measured at 190° C. and 2.16 kg loading) of 0.8 g/10 min or greater, such as 1.0 g/10 min or greater, or 1.5 g/10 min or greater. In some instances, however, too great a melt index may detrimentally impact final polymer composition properties. Furthermore, excessively high MI in the carrier resin can cause immiscibility with the polymer composition to which the masterbatch is being added. Thus, the carrier resin may have MI within the range from 0.8 or 1.0 or 1.5 g/10 min to 4.0, 4.5, 5.0, 7.5, or 10.0 g/10 min. Particular examples include polyethylene having such MI.

Ethylene copolymers are suitable examples of such polyethylene, such as metallocene-catalyzed copolymers of ethylene and one or more of 1-butene, 1-hexene, and 1-octene, known as mLLDPE (metallocene linear low density polyethylene), e.g., Exceed™ performance polyethylene from ExxonMobil, such as Exceed 1018 or Exceed 2018. Other examples include Ziegler-Natta catalyzed LLDPE (ZN-LLDPE), such as copolymers of ethylene and 1-butene, 1-hexene, and/or 1-octene, as catalyzed by Ziegler Natta catalysts (such polymers typically having broader molecular weight distribution, Mw/Mn, as compared to metallocene-catalyzed counterparts). Yet further suitable examples include low density polyethylene (LDPE) as may be produced from free radical polymerization, particularly a high pressure polymerization process.

PEG loading in the masterbatch can be adjusted as needed, and the ordinarily skilled artisan will readily recognize the inverse relationship between PEG loading in the PEG masterbatch, and amount of masterbatch to be deployed in a polymer composition in order to achieve target PEG loading in the polymer composition (e.g., as the PEG masterbatch comprises more PEG, correspondingly less PEG masterbatch need be loaded into the polymer composition). For sake of illustration, example loadings of PEG in PEG masterbatch include PEG within the range from a low of 1, 2, 3, 4, or 5 wt % to a high of 5, 6, 7, 8, 9, 10, 20, 25, 30, 35, 40, 45, or 50 wt %, with ranges from any foregoing low end to any foregoing high end contemplated (provided the high end is greater than the low end). However, it is preferred to keep PEG loading in the masterbatch relatively lower (e.g., within the 1-20 wt % range, such as 1-10 wt %, or 2 to 7 wt %), particularly for PEG having Mw within the range from 7500 to 11,000 g/mol. Thus, a PEG masterbatch comprising 4 wt % PEG (on basis of mass of masterbatch) may be deployed at 2.5 wt % loading (25000 ppm), on the basis of mass of the polymer composition, to maintain 1000 ppm PEG loading the polymer composition; and deployed at 5.0 wt % loading (50000 ppm), on the basis of mass of the polymer composition, to maintain 2000 ppm PEG loading in the polymer composition.

Finally, as discussed elsewhere herein, additional additives and/or a PPA blend partner may be included in the polymer composition. It is contemplated that such additives and/or PPA blend partner may be added to the polymer composition separately from a PEG masterbatch, or as part of the PEG masterbatch.

In yet other embodiments, however, PEG alone can be an excellent PPA, and therefore a PEG masterbatch of such embodiments may have no PPA blend partner, and the final polymer product may be free or substantially free of metal salt of a fatty acid and/or a polysorbate, or other PPA blend partner. In this context, "substantially free" means no such compound is intentionally added, although minor amounts of impurity (e.g., 10 ppm or less, preferably 1 ppm or less, such as 1 ppb or less) could be present.

Methods of Introducing PEG-Based PPA Composition to Polymer Compositions

Methods in accordance with various embodiments include adding polyethylene glycol (or, equivalently, a PEG masterbatch) and/or a PEG-based PPA composition (according to the above description) to a polymer composition (e.g., polymer granules and/or slurry) exiting a polymerization reactor to form a pre-finished polymer mixture in or upstream of a compounding extruder. The pre-finished polymer mixture therefore includes the polymer and PEG-based PPA composition (both per above respective descriptions), as well as any optional other additives (which may be provided to the mixture along with, before, or after the PEG-based PPA composition). The pre-finished polymer mixture may, for example, be a polymer melt (e.g., formed in or just upstream of a compounding extruder). The mixture is then extruded and optionally pelletized to form a further polymer composition (e.g., polymer pellets) comprising the PEG-based PPA composition and polymer (each per above, and with the PEG or PEG-based PPA composition in amounts in accordance with the above discussion), as well as any optional other additive(s).

Also or instead, methods may include mixing finished polymer (e.g., polymer pellets) with PEG or PEG-based PPA composition to form a polymer article mixture; and processing the polymer article mixture to form a film. Such processing may be in accordance with well-known methods in the art, and in particular in accordance with blown film extrusion.

Thus, more generally, methods of the present disclosure can include: blending a PEG (or PEG masterbatch) with a polymer composition to form a polymer mixture, and forming the polymer mixture into a polymer product. The blending can be carried out as part of a finishing process (e.g., wherein the polymer composition is a reactor-grade polymer such as granules; and the polymer product comprises polymer pellets, providing a ready-to-use polymer product for making films or other polymeric articles). Or, the blending can be carried out as part of a process for forming polymeric articles such as films—for example, wherein the polymer composition is a finished polymer composition such as polymer pellets; and the polymer product comprises a polymeric article such as a film. Such processes highlight a more flexible approach, wherein polymer pellets or other finished polymer product without PPA are made ready for blown film or other article production through addition of the PEG-based PPA composition (e.g., PEG or PEG masterbatch). This also highlights embodiments of the present disclosure including PEG masterbatches, which could make for flexible products ready for addition to any number of finished polymer products as-needed for article (e.g., film) production.

The above methods and any other methods of mixing the PEG (or PEG-based PPA) with polymer to form a polymer composition as described herein, also include adequately mixing the PEG into the polymer. The present inventors have surprisingly found that not all methods of mixing PEG may be sufficient; instead, the PEG (or PEG-based PPA composition) should be melt blended at sufficiently high temperature and/or specific energy input (total mechanical energy forced into a polymer per unit weight, e.g., J/g, a metric for extent of mixing) with the polymer to achieve adequate homogenization among PEG and polymer. For instance, melt-blending such as through melting and then co-extrusion of the PEG and polymer (e.g., in a compounding extruder) under elevated temperature (e.g., 150° C. or more, such as 200° C. or more) can achieve adequate homogenization, while simply melting the PEG and tumble-blending with polymer does not achieve adequate homogenization. Thus, methods of various embodiments include mixing the PEG and polymer (e.g., polyethylene) in a manner that ensures both components melt during the mixing (e.g., melt-mixing, coextrusion in a compound extruder). Preferred methods according to some embodiments include melt-blending and coextruding the PEG and polymer (and optional other additives) in a compounding extruder, and pelletizing the mixture upon its exit from the extruder, thereby locking the homogenously blended mixture in place. More specifically, such methods can include: (a) feeding a PEG composition and a polymer (e.g., polyethylene) into an extruder (optionally with other additives); (b) coextruding the PEG composition and polymer in the extruder at an elevated temperature suitable for melting both the PEG and the polymer (e.g., 200° C. or higher); and (c) pelletizing the extrudate to form the polymer composition comprising the PEG-based PPA. Preferably, the extrusion is carried out under oxygen-poor atmosphere (e.g., nitrogen atmosphere).

In the above discussion, as with other discussions herein, where "PEG" is referenced, a PEG masterbatch may be substituted therefor, as long as the relative amounts of PEG delivered to a polymer composition via masterbatch remain consistent with amounts of PEG alone that would be delivered to the polymer composition.

Other Additives

As noted, other additives optionally can also be present in the polymer composition (e.g., antioxidants, stabilizers such as UV stabilizers, catalyst neutralizers, and other additives known in the art of polymerization). Where such additives are employed, they are also preferably free or substantially free of fluorine. Further, it is reiterated that where other additives are present, the mass of such additives is included in the denominator for determining the ppm loading amounts for PEG-based PPA described herein (that is, the ppm loading is on the basis of total mass of polymer+PPA+ other additives).

According to various embodiments, it may be advantageous to employ an additive package including antiblock and/or slip agents, potentially along with other additives. In particular as regards antiblock and slip agents, data indicate these may provide a potential advantage of quicker melt fraction elimination when employed with the PEG-based PPA. Examples of antiblock agents are well known in the art, and include talc, crystalline and amorphous silica, nepheline syenite, diatomaceous earth, clay, or various other anti-block minerals. Particular examples include the Optibloc agents available from Mineral Technologies. Examples of slip agents for polyolefins include amides such as erucamide and other primary fatty amides like oleamide; and further include certain types of secondary (bis) fatty amides. Antiblock agent loading is often around 500 to 6000 ppm, such as 1000 to 5000 ppm; slip agent loading is typically 200 to 1000, 2000, or 3000 ppm. Other can include, for example: fillers; antioxidants (e.g., hindered phenolics such as IRGANOX™ additives available from Ciba-Geigy); phosphites (e.g., IRGAFOS™ compounds available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; release agents; anti-static agents; pigments; colorants; dyes; waxes; silica; fillers; talc; mixtures thereof, and the like.

Films

As noted, a significant reason for employing PPAs is to eliminate melt fracture in blown films. Ideally, when replacing incumbent PPAs with the PEG-based PPA composition of the present disclosure, films made from polymer compositions including such PEG-based PPA composition will exhibit similar or superior properties as compared to films made using polymer compositions comprising conventional PPA.

Thus, the invention of the present disclosure can also be embodied in a film made from any of the above-described polymer compositions (and in particular, polyethylene compositions) comprising the polymer and 250 to 15000 ppm (such as 250 to 11000 ppm) of the PEG-based PPA composition (e.g., such that PEG(s) in the PPA have Mw less than 40,000 g/mol, such as within the range from 3000, 4000, 5000, 6000, or 7500 g/mol to 11000, 15000, 20000, or 35000 g/mol), and preferably being free or substantially free of fluorine; wherein the film has one or more of (and preferably all of):

- 1% secant modulus (MD) within +/−5% psi, preferably within +/−1% psi, of the value (psi) of a film that is made using a fluoropolymer-based PPA instead of the PEG-based PPA composition, but is otherwise identical;
- Elmendorf tear (MD) within +/−10% g, preferably within +/−5% g, of the value (g) of a film that is made using a fluoropolymer-based PPA instead of the PEG-based PPA composition, but is otherwise identical;
- Total haze within +/−25%, preferably within +/−10%, of the value (in %) of a film that is made using a fluoropolymer-based PPA instead of the PEG-based PPA composition, but is otherwise identical, and/or total haze less than 6%;
- Gloss (MD) within +/−12%, preferably within +/−10%, of the value (in GU) of a film that is made using a fluoropolymer-based PPA instead of the PEG-based PPA composition, but is otherwise identical; and
- Dart within +/−1%, preferably within +/−0.5% or even within +/−0.1%, of the value (g) of a film that is made using a fluoropolymer-based PPA instead of the PEG-based PPA composition, but is otherwise identical.

Where the PEG-based PPA composition includes a PPA blend partner (e.g., metal salt of a fatty acid, such as zinc stearate), the amounts (in ppm) of PEG-based PPA composition still apply, but within those amounts (e.g., within the 250 to 15000 ppm), the PEG and PPA blend partner are present in a weight ratio of 30:70 to 70:30 (PEG:PPA blend partner), and preferably are present at a 1:1 ratio (e.g., such that 1000 ppm PEG-based PPA composition of such embodiments equates to 500 ppm PEG and 500 ppm PPA blend partner).

Further, in the discussion above, a film "made using a fluoropolymer-based PPA instead of the PEG-based PPA composition, but is otherwise identical" is intended to mean that a film made using an effective amount of PEG-based PPA composition is compared against a film made using an effective amount of fluoropolymer-based PPA; not necessarily that the same amount of each PPA is used. An effective amount is such that visible melt fractures are eliminated from the film, consistent with the discussion in connection with Example 1.

EXAMPLES

To facilitate a better understanding of the embodiments of the present invention, the following examples of preferred or representative embodiments are given.

Example 1 Trial Runs

Blown film trials were conducted on a blown film extruder line L2 with extruder and die characteristics, conditions, and temperature profile per Table 1 below.

TABLE 1

L2 Extruder and Die Processing Conditions

| | | | |
|---|---|---|---|
| Die diameter (in.): | 2 | Forming cone (turns out): | 1 |
| Die gap (mil): | 30 | Zone 1 temp. (F): | 310 |
| Mass air ring height (in): | 0.250 | Zone 2 temp. (F): | 410 |

TABLE 1-continued

L2 Extruder and Die Processing Conditions

| | | | |
|---|---|---|---|
| Chimney height (in): | 0.875 | Zone 3 temp. (F): | 380 |
| Gauge (mil): | 2-5 mil | Zone 4 temp. (F): | 350 |
| BUR: | 2.5 | Screen changer temp. (F): | 360 |
| Frostline height (in): | 10 | Adapter temp. (F): | 360 |
| Die factor (lbs/hr-in): | — | Block zone temp. (F): | 360 |
| Output (lbs/hr): | 25 | Die zones 1&2 temp. (F): | 390 |
| Line Speed (ft/min): | — | Target melt temp. (F): | 390 |

Multiple films were made using seven different polyethylene resins. Nominally, each sample of the same resin would have the density, MI, and MIR values; in general, the nominal properties of each of the seven resins were as follows in Table 2. Table 2 also indicates the composition distribution of each PE resin, where "homogeneous" means comonomer is distributed relatively evenly across polymer chains of different length, and "BOCD" means "broad orthogonal composition distribution," referring to comonomer distribution where longer (higher-molecular-weight) chains have a greater amount of comonomer as compared to shorter (lower-molecular-weight) chains in the polymer composition. Each of the "homogeneous" and "BOCD" characteristics can be approximated to a range of composition distribution breadth index (CDBI), which is defined as the weight percent of the copolymer molecules having a comonomer content within 50% of the median total molar comonomer content (i.e. the wt % of polymer molecules having comonomer molar content that is within a range from 0.5× median to 1.5× median); it is referenced, e.g., in U.S. Pat. No. 5,382,630. "Homogeneous" PE resins have CDBI greater than 60%; BOCD resins have CDBI less than 40%, and furthermore are such that greater amounts of comonomer are present on higher-molecular-weight chains vs. lower-molecular-weight chains. Various other methods useful for quantifying BOCD nature are discussed above.

TABLE 2

Nominal Properties of PE Resins Used in Trial Runs

| Base PE | Density | MI | HLMI | MIR | Composition Distribution |
|---|---|---|---|---|---|
| PE1 | 0.918 | 0.5 | 15.0 | 30 | BOCD |
| PE2 | 0.918 | 1.5 | 45.0 | 30 | BOCD |
| PE3 | 0.918 | 1.0 | 30.0 | 30 | BOCD |
| PE4 | 0.918 | 1.0 | 20.0 | 20 | BOCD |
| PE5 | 0.918 | 1.0 | 16.0 | 16 | Homogeneous |
| PE6 | 0.918 | 1.5 | 24.0 | 16 | Homogeneous |
| PE7 | 0.928 | 1.0 | 16.0 | 16 | Homogeneous |

However, due to expected variations in measurement conditions and the nature of the properties measured, some deviations were observed in each resin among the different formulations tested. Therefore, Table 3 below reports each resin as measured specifically to each test run, grouped according to the PPA composition tested (where, for PPA compositions in Table 3: "Dynamar" is Dynamar™ FX5929M, an incumbent fluoropolymer-containing PPA; "Pluriol" is Pluriol® E 8000, a PEG having Mw of about 8,000 g/mol; Avapol is Avapol™ 60K from Avatar Corporation; and ZnSt is a zinc stearate composition (an example of a metal salt of a fatty acid)).

TABLE 3

Resin and PPA formulations used for each trial run

| Trial ID | Base PE + Composition | Density | MI | HLMI | MIR |
|---|---|---|---|---|---|
| C-1 | PE1 + 400 ppm Dynamar | 0.919 | 0.53 | 15.3 | 28.6 |
| C-2 | PE2 + 400 ppm Dynamar | 0.919 | 1.52 | 44.0 | 28.9 |
| C-3 | PE3 + 400 ppm Dynamar | 0.919 | 1.05 | 30.1 | 28.8 |
| C-4 | PE4 + 400 ppm Dynamar | 0.918 | 1.03 | 20.0 | 19.5 |
| C-5 | PE5 + 400 ppm Dynamar | 0.919 | 0.94 | 15.4 | 16.3 |
| C-6 | PE6 + 400 ppm Dynamar | 0.919 | 1.50 | 24.0 | 16.0 |
| C-7 | PE7 + 400 ppm Dynamar | 0.929 | 0.92 | 15.5 | 16.8 |
| I-1 | PE1 + 1000 ppm Pluriol | 0.919 | 0.59 | 16.4 | 27.9 |
| I-2 | PE2 + 1000 ppm Pluriol | 0.920 | 1.61 | 46.2 | 28.6 |
| I-3 | PE3 + 1000 ppm Pluriol | 0.918 | 1.07 | 20.5 | 19.1 |
| I-4 | PE4 + 1000 ppm Pluriol | 0.919 | 1.06 | 28.4 | 26.8 |
| I-5 | PE5 + 1000 ppm Pluriol | 0.919 | 0.98 | 15.7 | 16.0 |
| I-6 | PE6 + 1000 ppm Pluriol | 0.919 | 1.53 | 24.0 | 15.7 |
| I-7 | PE7 + 1000 ppm Pluriol | 0.929 | 0.97 | 15.8 | 16.2 |
| I-8 | PE1 + 1000 ppm Avapol | 0.919 | 0.58 | 16.6 | 28.6 |
| I-9 | PE2 + 1000 ppm Avapol | 0.919 | 1.63 | 46.5 | 28.6 |
| I-10 | PE3 + 1000 ppm Avapol | 0.919 | 1.09 | 30.8 | 28.3 |
| I-11 | PE4 + 1000 ppm Avapol | 0.918 | 1.03 | 19.3 | 18.8 |
| I-12 | PE5 + 1000 ppm Avapol | 0.919 | 0.94 | 15.3 | 16.3 |
| I-13 | PE6 + 1000 ppm Avapol | 0.919 | 1.49 | 23.9 | 16.1 |
| I-14 | PE7 + 1000 ppm Avapol | 0.929 | 0.90 | 15.5 | 17.2 |
| I-15 | PE1 + 500/500 ppm Znst/Pluriol | 0.919 | 0.60 | 16.6 | 27.9 |
| I-16 | PE2 + 500/500 ppm Znst/Pluriol | 0.919 | 1.55 | 44.9 | 29.0 |
| I-17 | PE3 + 500/500 ppm Znst/Pluriol | 0.919 | 1.05 | 29.4 | 28.0 |
| I-18 | PE4 + 500/500 ppm Znst/Pluriol | 0.918 | 1.03 | 19.2 | 18.7 |
| I-19 | PE5 + 500/500 ppm Znst/Pluriol | 0.919 | 0.94 | 15.1 | 16.1 |
| I-20 | PE6 + 500/500 ppm Znst/Pluriol | 0.919 | 1.50 | 23.8 | 15.9 |
| I-21 | PE7 + 500/500 ppm Znst/Pluriol | 0.929 | 0.91 | 15.3 | 16.9 |

The same general process was used for film production for each trial run in order to investigate the elimination of melt fracture using different PPAs on each PE resin; extruder die pressure experienced for each PPA was also recorded and analyzed. More particularly, the process was as follows:

Run extruder with a 2:1 blend of purge resin: Polybatch® KC 30. Continue until clean, about 30 min. The Purge resin used in this preliminary cleaning step for each trial is a PPA-free version of the same polyethylene used for film production for the given trial.

Manually clean and polish inner die with polishing paste (Improved Old Purpose Mold Polish by IMS Company).

Run purge resin until KC30 is gone and melt fracture is steady, about 45 min. Typical purge resin rates were 2-3 lbs/hr to obtain steady melt-fracture free film product.

Set test timer to 0. Feed test resin (resin plus PPA Blend being tested) at target output rate. Adjust rpm to get target output within the first 15 min.

Every 15 min: take 2 ft. film sample and label w/test resin, date & collection time, record run data on table.

Run until whichever comes first: melt fracture is eliminated or 105 minutes.

As the PPA-containing resin of each trial was fed, the melt fractures slowly began to disappear in streaks as illustrated in FIG. 1. With reference to FIG. 1, as the PPA is added, melt fracture-free regimes begin to emerge as stripes 101 in the machine direction 110 of the film 100 (that is, the direction in which the film is extruded and blown). FIG. 1 is a schematic conceptually illustrating this transitory period with streaks 105 of melt-fractured film material, and the stripes 101 of melt fracture-free film. Over time, these stripes 101 grow in width and the melt fracture zones diminish, and, ideally, will eventually be eliminated completely. As noted, for these Example 1 trials, a 2 ft sample of film was obtained every 15 minutes for visual inspection to determine the % of melt fracture remaining in the film at the given 15-minute interval. Where melt fracture was completely eliminated between one sampling and the next (e.g., between the 45-minute and the 60-minute sample), elimination is reported at the mid-point between the samplings, rounded down (e.g., for the given 45- and 60-min example, recorded as 52 min).

The results from the Example 1 trials are summarized below in Tables 4-10 below (where Table 4 correspondents to trials using the different PPAs with PE1; Table 5 corresponds to trials using the different PPAs with PE2; etc.). Tables 4-10 report the following for each trial run: the amounts and ratios of components in each PPA blend; total PPA used; melt fracture observed at 105 min (MF @ 105 min) as a % of film area containing visible melt fractures; time to melt fracture elimination (MFE) in min; operating pressure at the extrusion die (psi); initial pressure at the extrusion die (psi); die factor; and specific output. Initial pressure and operating pressure provide an additional performance metric to track, insofar as a greater drop from initial to operating pressure is better (indicating greater ease of processing). In this experiment, operating pressure is taken as the final pressure at the end of the test (end time if melt fracture persisted, or the time at which complete melt fracture elimination was observed). Specific Output is the output of film (defined as lb/hr divided by extruder speed (rpm)), and die factor is the output (lb/hr) divided by die circumference (in).

TABLE 4

Films Made using PE1 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-1 | Dynamar | 400 | 0 | 97 | 4560 | 5230 | 4.2 | 1.3 |
| I-1 | Pluriol | 1000 | 0.2 | N/A | 4525 | 5455 | 4.2 | 1.4 |
| I-8 | Avapol | 1000 | 8 | N/A | 4960 | 5670 | 3.6 | 1.2 |
| I-15 | Znst/Pluriol | 500/500 | 3.4 | N/A | 5055 | 5755 | 3.9 | 1.3 |

Figure 2:
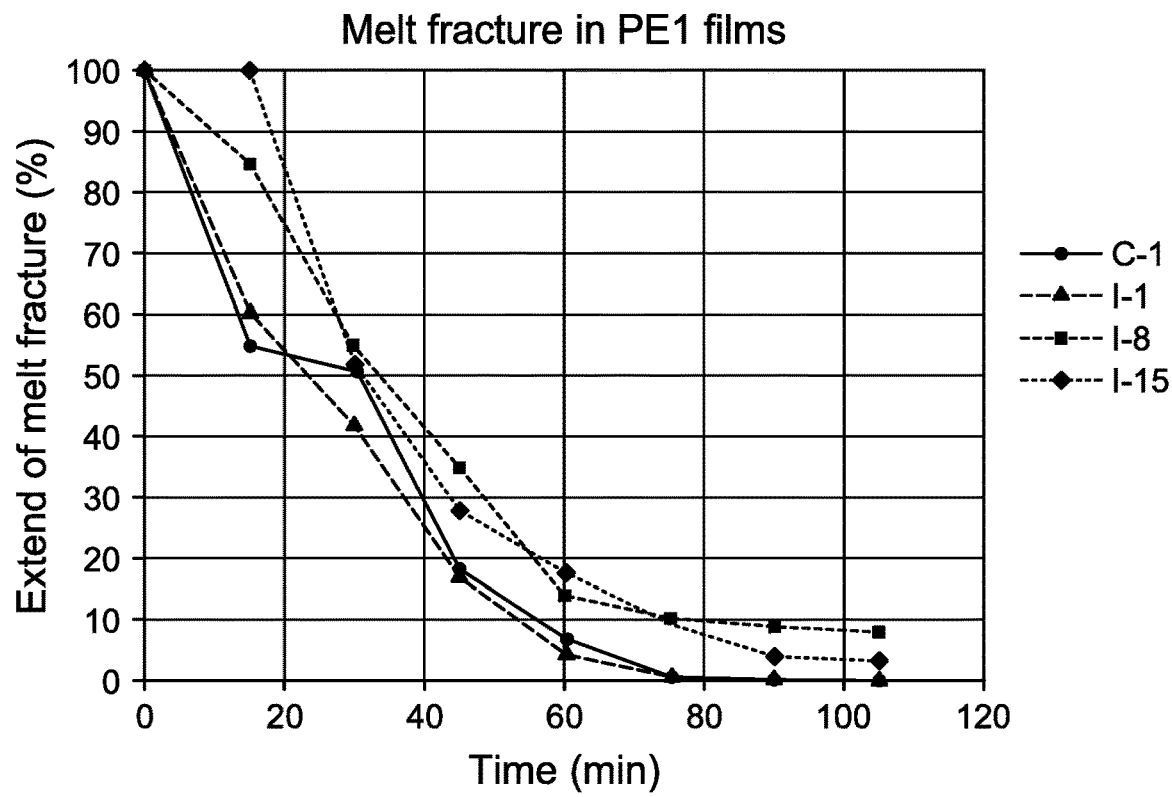
FIG. 2 is a graph showing the observed melt fracture % over time for certain trial films produced using various PPA compositions in connection with the examples.

FIG. 2 is a graphical illustration of the observed melt fracture % over time for the PE1 films of Table 4, illustrating the rate at which melt fractions were eliminated by each trial PPA composition. FIG. 2 shows very similar performance between C-1 and I-1, indicating a high likelihood that Pluriol PPA would have eliminated melt fracture with a few additional minutes of runtime.

TABLE 5

Films Made using PE2 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-2 | Dynamar | 400 | 0.2 | N/A | 2670 | 5470 | 4.4 | 1.4 |
| I-2 | Pluriol | 1000 | 0.2 | N/A | 2695 | 5635 | 4.2 | 1.4 |
| I-9 | Avapol | 1000 | 0.2 | N/A | 2875 | 5645 | 4.0 | 1.3 |
| I-16 | Znst/Pluriol | 500/500 | 1.2 | N/A | 3035 | 5560 | 4.2 | 1.4 |

Figure 3:
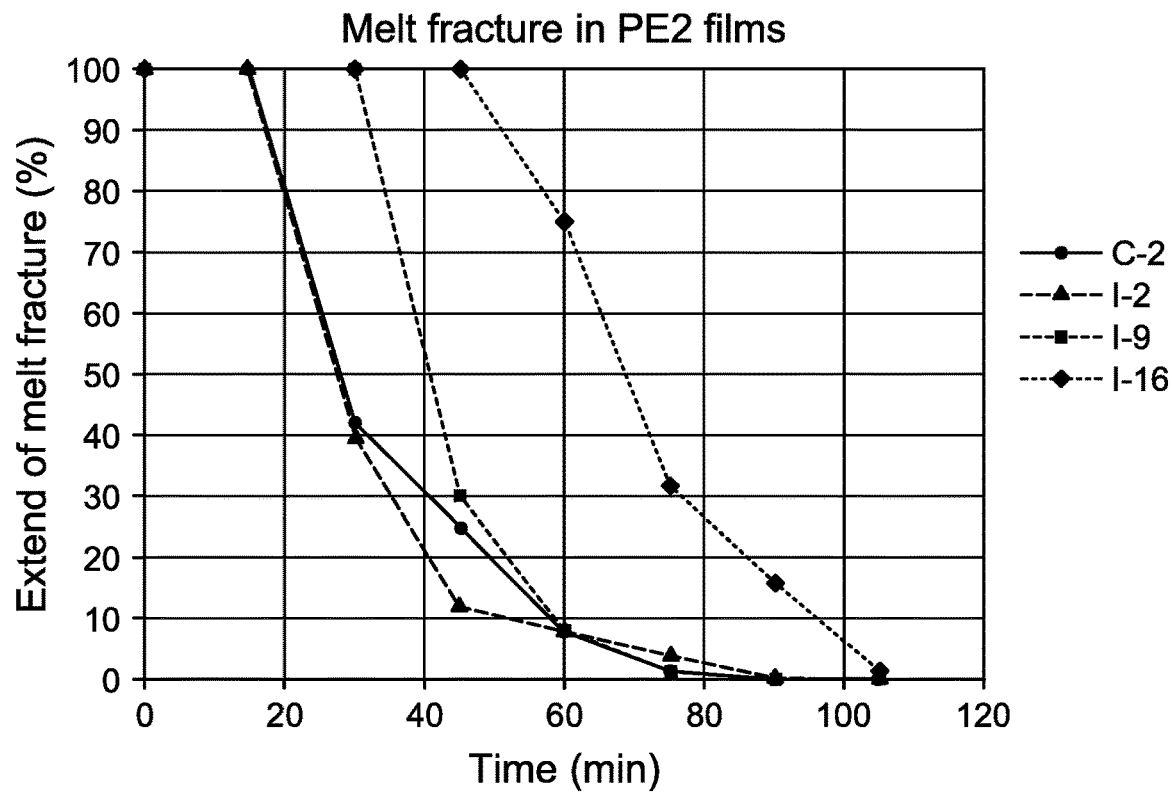
FIG. 3 is a graph showing the observed melt fracture % over time for other trial films produced using various PPA compositions in connection with the examples.

FIG. 3 is a graphical illustration of the observed melt fracture % over time for the PE1 films of Table 5, illustrating the rate at which melt fractions were eliminated by each trial PPA composition. FIG. 3 shows Pluriol once again performing similar or better to the incumbent Dynamar PPA, with excellent performance also shown from Avapol. ZnSt/Pluriol had slower initial elimination of melt fracture, but ended with a similar level of elimination. As with Table 4 and FIG. 2, FIG. 3 illustrates that Pluriol and Avapol, and likely ZnSt/Pluriol as well, would be expected to result in melt fracture elimination with additional runtime.

TABLE 6

Films Made using PE3 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-3 | Dynamar | 400 | 0.3 | N/A | 3360 | 5260 | 4.4 | 1.4 |
| I-3 | Pluriol | 1000 | 0 | 82 | 3760 | 5445 | 4.4 | 1.5 |

TABLE 6-continued

Films Made using PE3 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| I-10 | Avapol | 1000 | 2.1 | N/A | 3570 | 5730 | 3.5 | 1.2 |
| I-17 | Znst/Pluriol | 500/500 | 0.9 | N/A | 3790 | 5680 | 4.0 | 1.3 |

Figure 4:
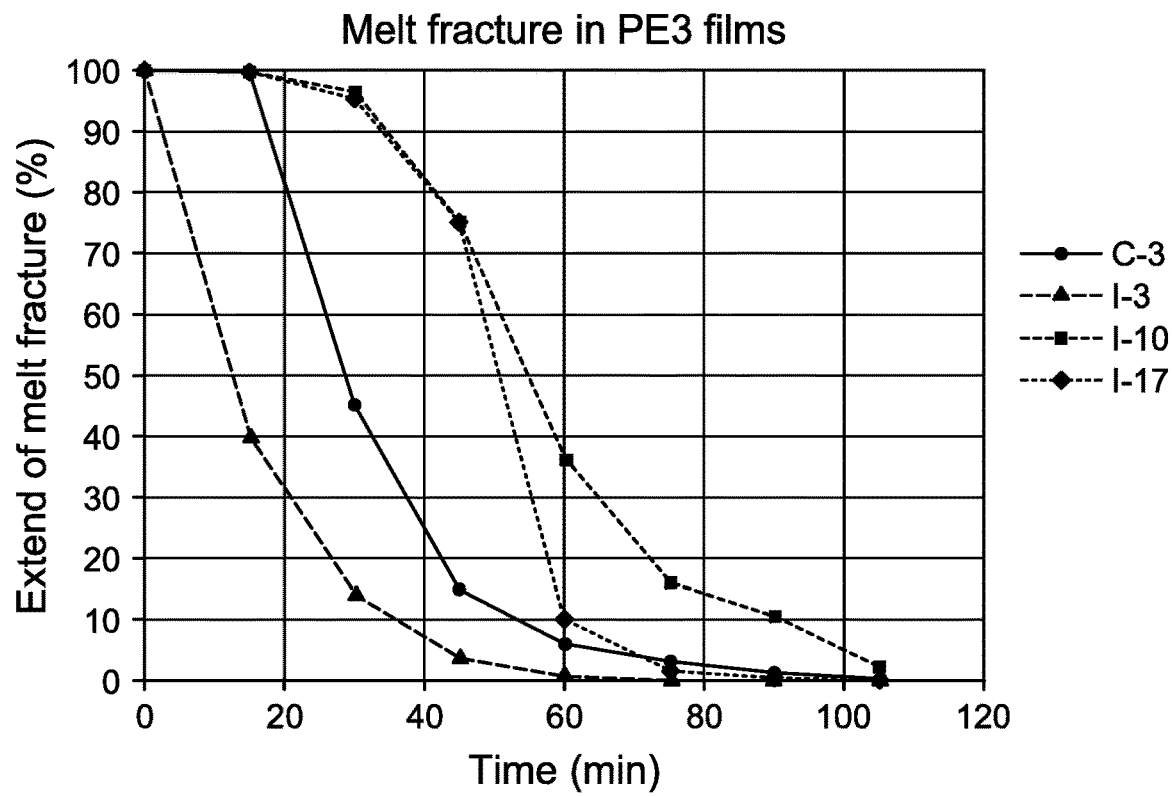
FIG. 4 is a graph showing the observed melt fracture % over time for further trial films produced using various PPA compositions in connection with the examples.

FIG. 4 is a graphical illustration of the observed melt fracture % over time for the PE1 films of Table 6, illustrating the rate at which melt fractions were eliminated by each trial PPA composition. FIG. 4 shows that all tested PPA compositions exhibit a strong downward trend in melt fracture elimination, although the Pluriol PPA (I-3) exhibits superior performance, even when compared to the incumbent Dynamar PPA.

TABLE 7

Films Made using PE4 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-4 | Dynamar | 400 | 0.2 | N/A | 3870 | 5230 | 4.4 | 1.4 |
| I-4 | Pluriol | 1000 | 0.5 | N/A | 3245 | 5580 | 4.2 | 1.4 |
| I-11 | Avapol | 1000 | 32 | N/A | 4415 | 5645 | 3.9 | 1.2 |
| I-18 | Znst/Pluriol | 500/500 | 0 | 67 | 4370 | 5745 | 4.2 | 1.4 |

Figure 5:
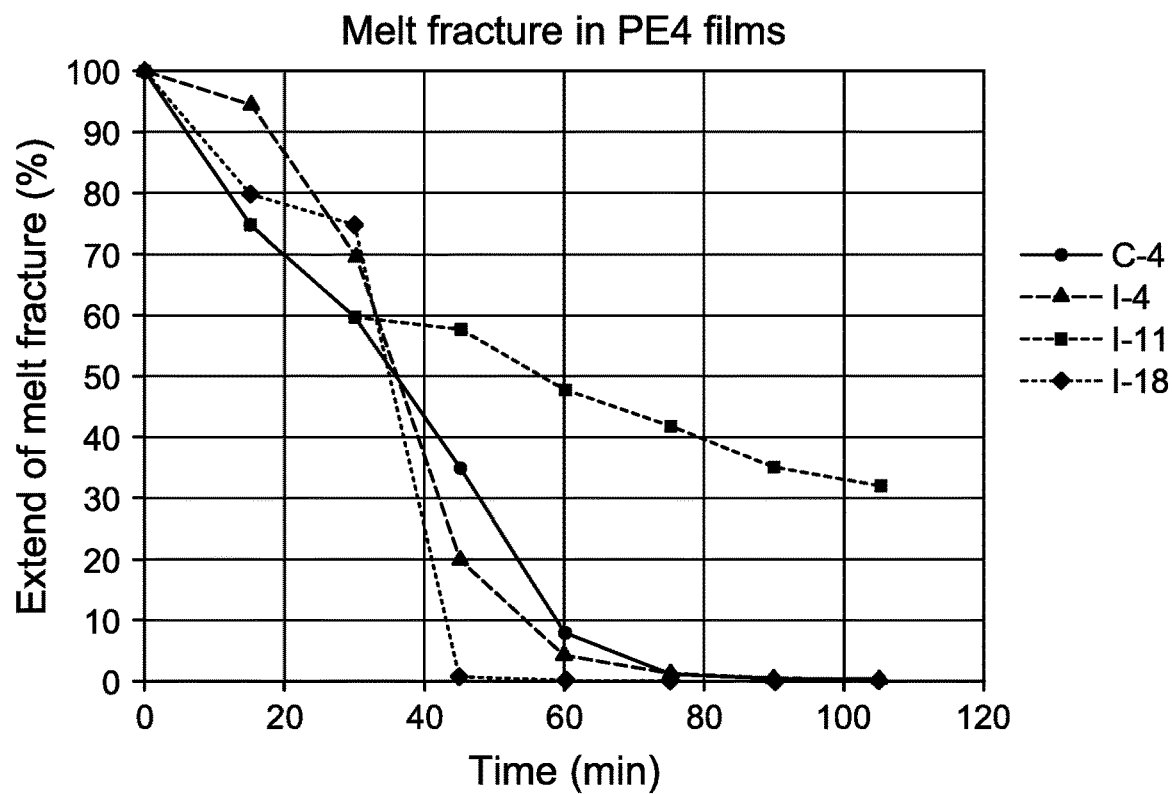
FIG. 5 is a graph showing the observed melt fracture % over time for yet further trial films produced using various PPA compositions in connection with the examples.

FIG. 5 is a graphical illustration of the observed melt fracture % over time for the PE1 films of Table 7, illustrating the rate at which melt fractions were eliminated by each trial PPA composition. FIG. 5 shows that ZnSt/Pluriol and Pluriol both out-performed the Dynamar PPA through much of the experiment, although only the ZnSt/Pluriol combination finally pushed to 0% melt fracture at the end of the run, while Pluriol and Dynamar PPA films still exhibited a minor amount (again, expected to be eliminated with additional runtime). Interestingly, the Avapol (Polysorbate) PPA appears to have plateaued at approximately 30% melt fracture, indicating that it would likely not eliminate melt fracture in PE4 at 1000 ppm loading; likely a higher loading would be required for melt fracture elimination.

TABLE 8

Films Made using PE5 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-5 | Dynamar | 400 | 0 | 52 | 4370 | 5510 | 4.2 | 1.4 |
| I-5 | Pluriol | 1000 | 0 | 37 | 4380 | 5460 | 4.5 | 1.5 |
| I-12 | Avapol | 1000 | 0 | 37 | 4475 | 5665 | 4.0 | 1.4 |
| I-19 | Znst/Pluriol | 500/500 | 0 | 37 | 4940 | 5780 | 4.1 | 1.4 |

Figure 6:
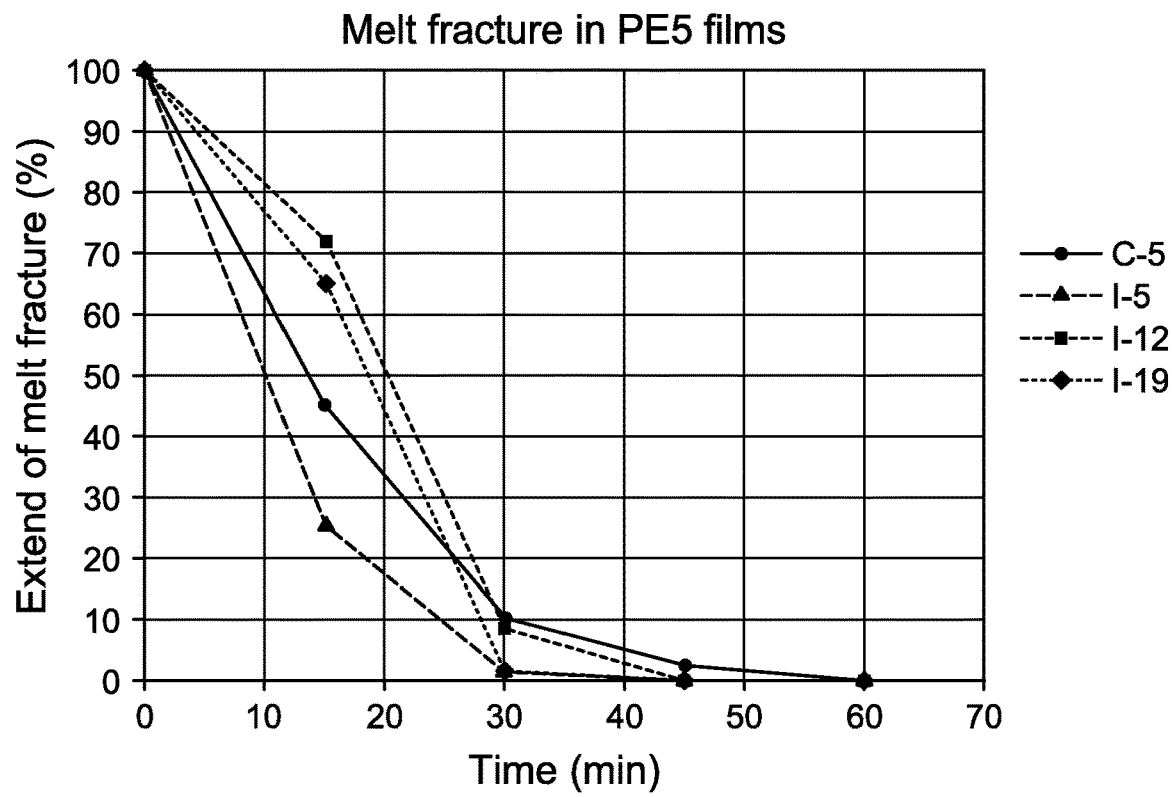
FIG. 6 is a graph showing the observed melt fracture % over time for another set of trial films produced using various PPA compositions in connection with the examples.

FIG. 6 is a graphical illustration of the observed melt fracture % over time for the PE1 films of Table 8, illustrating the rate at which melt fractions were eliminated by each trial PPA composition. FIG. 6 shows highly similar (and strong) performance for all tested PPAs, although it is interesting to note, as summarized in Table 8, that Pluriol, Avapol, and ZnSt/Pluriol all outperformed Dynamar in melt fracture elimination in PE5.

TABLE 9

Films Made using PE6 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-6 | Dynamar | 400 | 0 | 52 | 3270 | 5435 | 4.4 | 1.5 |
| I-6 | Pluriol | 1000 | 0 | 37 | 3445 | 5460 | 4.5 | 1.5 |
| I-13 | Avapol | 1000 | 0 | 37 | 3390 | 5780 | 4.2 | 1.5 |
| I-20 | Znst/Pluriol | 500/500 | 0 | 37 | 3940 | 5730 | 4.2 | 1.5 |

Figure 7:
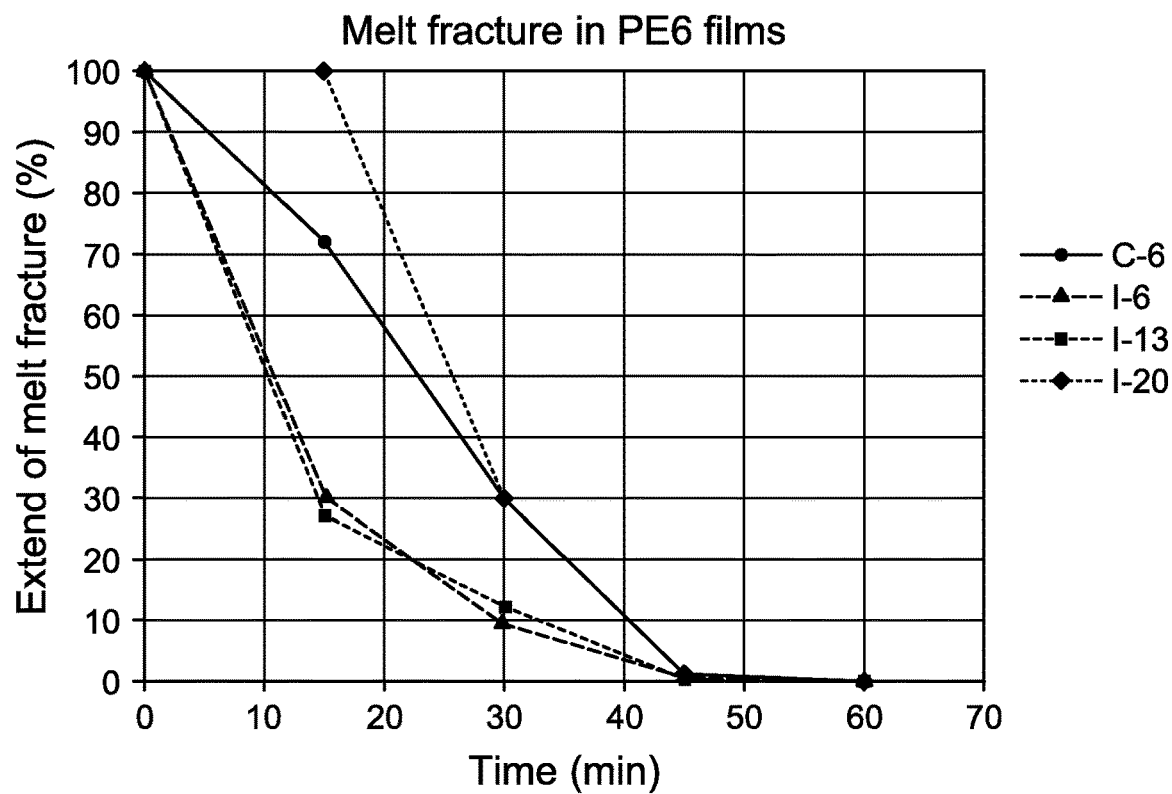
FIG. 7 is a graph showing the observed melt fracture % over time for a further set of trial films produced using various PPA compositions in connection with the examples.

FIG. 7 is a graphical illustration of the observed melt fracture % over time for the PE1 films of Table 9, illustrating the rate at which melt fractions were eliminated by each trial PPA composition. FIG. 7, similar to FIG. 6, shows strong performance from all tested PPAs, with the three alternative, fluorine-free, PPA formulations again delivering faster melt fraction elimination than the incumbent fluoropolymer-based Dynamar PPA.

TABLE 10

Films Made using PE7 and Trial PPA compositions

| ID | PPA (—) | PPA (ppm) | MF @ 105 min (%) | Time to MFE (min) | Pressure (psi) | Initial Pressure (psi) | Die factor (lbs/hr-in die) | Specific output (lbs/hr-rpm) |
|---|---|---|---|---|---|---|---|---|
| C-7 | Dynamar | 400 | 0 | 82 | 4160 | 5350 | 4.2 | 1.4 |
| I-7 | Pluriol | 1000 | 0 | 52 | 4080 | 5525 | 4.2 | 1.5 |
| I-14 | Avapol | 1000 | 0.4 | N/A | 4260 | 5770 | 3.8 | 1.3 |
| I-21 | Znst/Pluriol | 500/500 | 0 | 37 | 4835 | 5390 | 4.1 | 1.4 |

Figure 8:
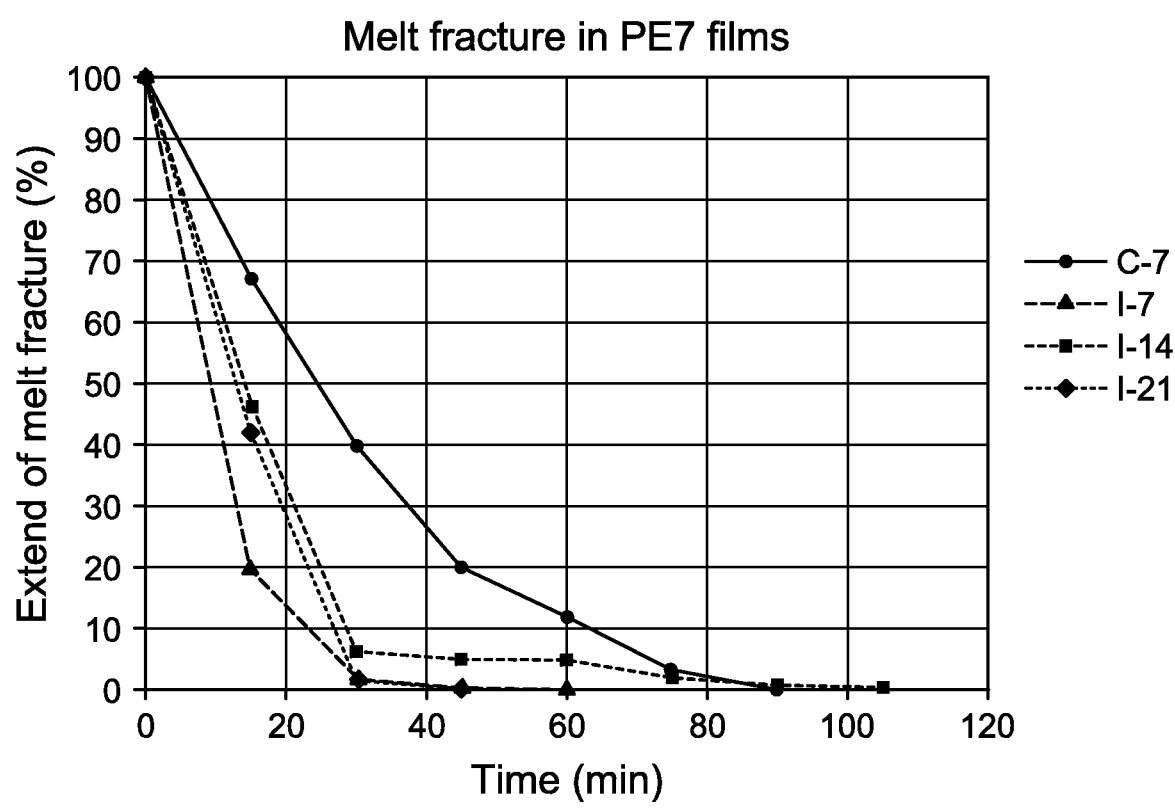
FIG. 8 is a graph showing the observed melt fracture % over time for an additional set of trial films produced using various PPA compositions in connection with the examples.

FIG. 8 is a graphical illustration of the observed melt fracture % over time for the PE1 films of Table 10, illustrating the rate at which melt fractions were eliminated by each trial PPA composition. FIG. 8 shows all fluorine-free PPA formulations outperforming the Dynamar formulation in terms of quickness in eliminating almost all melt fractures, except that a slight amount of melt fracture remains in the Avapol PPA film (but, with the trend showing likely melt fracture elimination with additional runtime).

Discussion

With the exception of two trial runs utilizing Avapol (Polysorbate) as a PPA, all fluorine-free alternative PPA formulations performed either comparably to or better than the incumbent fluoropolymer-containing Dynamar PPA formulation. And, the two instances where Avapol retained some substantial degree of melt fracture (1-8 and I-11) could likely be overcome with greater loading. Otherwise, the fluoropolymer-free PPA formulations exhibited typically faster melt fracture elimination, with similar or only slightly higher pressure deltas as compared to the incumbent Dynamar PPA, indicating that all three classes of fluoropolymer-free PPA formulation tested have great promise.

However, reviewing the entire data set, it is seen that PPA compositions using only Pluriol (PEG 8 k), and those using a 50/50 blend of Pluriol and ZnSt, were the most robust in the sense that, across a range of different PE resins, these PPA compositions had the highest percentage of success, and furthermore generally outperformed the incumbent Dynamar PPA in terms of speed of melt fracture elimination. In particular, Pluriol alone failed to completely eliminate melt fracture during the 105-min test period in only three cases (I-1, 1-2, and 1-4), but in all three instances, only a very minor portion of film exhibited melt fracture (0.2%, 0.2%, and 0.5%, respectively), indicating a high likelihood that slightly longer run time would have resulted in complete elimination of melt fracture.

Pluriol and ZnSt combination likewise failed to completely eliminate melt fracture in only three instances (I-15, 1-16, and I-17); in each case, only a small amount of melt fracture remained (3.4%, 1.2%, and 0.9%, respectively).

Compiling this information, the Pluriol alone is the superior performer when targeting robust application across multiple resins with different rheology and composition distribution; furthermore, the results indicate that ZnSt could be employed selectively as a PPA blend partner with PEG 8 k in targeted instances to even further improve the robustness of the PPA composition in a polymer production campaign. In particular, Table 7 (dealing with PE4) is the sole instance where both (i) Pluriol (PEG 8K) alone failed to eliminate melt fracture in 105 minutes, while (ii) the Pluriol/ZnSt combination succeeded. This indicates that ZnSt could be employed when dealing with a polymer having one or more of: relatively lower MIR; relatively higher MI; and/or a BOCD nature. Indeed, this selective deployment may be particularly useful in view of the observation Table 6 (PE3), where Pluriol alone succeeded while addition of ZnSt led to melt fracture remaining on the film at 105 minutes. PE3, like PE4, had MI of 1.0, but notably a substantially higher MIR (30 as compared to the 20 MIR of PE4), providing further indication that ZnSt blend partner should be employed only for films made from lower MIR resin.

It is also seen that in general the BOCD resins (PE1, PE2, PE3, and PE4) present a greater challenge for melt fracture elimination, while a broader range of options is available for the homogeneous material (PE5, PE6, PE7) tested, noting that all PPA options performed exceedingly well (with only a single instance in which Avapol, a polysorbate composition, left 0.4% melt fracture after 105 minutes, with the trend over time indicating complete elimination would likely be achieved with a slightly longer run time). Thus, the above guidance for employing ZnSt as a PPA blend partner may only be necessary when dealing with films made from BOCD-type polymers.

Finally, even though the best performing PPA for a single run varied from resin to resin, as a practical matter, using completely different PPA compositions from grade to grade in a polymer production campaign is highly inefficient; therefore, there is substantial value in identifying the most robust PPA composition(s) across multiple grades. Hence, the Pluriol with optional targeted addition of ZnSt provides an excellent solution.

Example 2—Masterbatches

Given the promise of PEG (optionally with ZnSt) as a PPA, further experimentation was carried out using PEG masterbatches to determine their suitability and effectiveness. Using a masterbatch approach made even the relatively lower molecular weight PEG compounds studied herein (e.g., PEG 8K) much easier to handle, overcoming the thermal instability issues (e.g., lower melting point) known to cause handling issues with lower molecular weight PEG.

So, a masterbatch was made, comprising 4 wt % Pluriol® E 8000 in Exceed™ 2018 polyethylene carrier resin (said wt % on basis of total mass of the carrier resin). Exceed™ 2018 polyethylene is a metallocene-catalyzed ethylene-1-hexene copolymer having MI of 2.0 g/10 min (190° C., 2.16 kg loading) and density of 0.918 g/cm$^3$. A total of 5 wt % of the PEG masterbatch was compounded with 95 wt % of PPA-free Exceed™ 1018 ethylene-1-hexene copolymer (available from ExxonMobil Chemical) and extruded into a film in the same manner as trial run films were produced in Example 1. This meant a total loading of 2000 ppm PEG (on the basis of mass of the polymer composition comprising the PEG masterbatch plus Exceed™ 1018 PE). The formulation successfully eliminated melt fracture in the film after 82 minutes.

Test Methods

Table 11 below reports the test methods used in connection with the Examples. Unless stated otherwise in the description of a given property, these methods are also to be used in determining properties in accordance with embodiments described herein.

TABLE 11

Measurement methods.

| Test Name or Parameter Name | Method or description |
|---|---|
| Melt index, high load melt index | ASTM D-1238 2.16 kg (melt index) or 21.6 kg (high load melt index), 190° C. |
| Melt index ratio | High load melt index/melt index |
| Density | ASTM D1505, column density. Samples were molded under ASTM D4703-10a, Procedure C , then conditioned under ASTM D618-08 (23° ± 2° C. and 50 ± 10% relative humidity) for 40 hours before testing |
| Percent melt fracture coverage | Measured by eye. The fraction of melt fracture Estimated visually from a 2-ft long sample of film, taken as a percentage of the area with noticeable, characteristic melt fracture roughness. Clear delineation existed between the melt fractured regions and the smooth, melt fracture free regions of the sample. |
| Pressure | Read off the in-line calibrated pressure transducer of the blown film line extruder, before the screen-pack, and recorded. |
| Die factor | Output (lb/hr)/die circumference (in). Output (lb/hr) = film sample weight (g, determined from a sample as measured on a fared, calibrated weight scale) × line speed (fpm, determined from an in-line tachometer) : film sample length (in, measured by yard stick) × 1.59 lb-in-min/g-ft-hr |
| Specific output | Output (lb/hr) / extruder speed (rpm). Output is computed as with die factor. Extruder speed measured by in-line tachometer. |
| PEG composition by NMR | 1 H NMR experiments were run on a 700MHz Broker Avance™ IIIHD equipped with a 10 mm high temperature dual channel cryoprobe. Samples were prepped at 140° C. with around 90 mg of sample per 3 ml of 1,1,2,2-tetrachloroethane-d2. Samples were measured using a 30° pulse or less, with 512 transients, a 15 second delay and a temperature of 120° C. The 15 second delay was determined to be needed for accurate quantitative 1 H NMR, The inversion recovery pulse sequence was used to measure T1 with a 20 second delay in between. The variable delay ranged from 1 millisecond to 5 seconds. Once the delay time was determined, samples with ranges of PEG from 0-1800 ppm were measured using the quantitative 1 H NMR conditions. Fits to determine T1 were performed using MestReNova 14.0.1. The signal area used for quantification was 3.8-3.5 ppm. |

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

While the present disclosure has been described with respect to a number of embodiments and examples, those skilled in the art, having the benefit of this disclosure, will appreciate that other embodiments can be devised which do not depart from the scope and spirit of the present disclosure.

We claim:

1. A method comprising:
   blending a PEG masterbatch with a finished polymer composition comprising polymer pellets to obtain a polymer mixture;
   wherein the PEG masterbatch comprises one or more PEGs each having weight-average molecular weight (Mw) within the range from 7,000 to 9,500 g/mol and a carrier resin, and is substantially free of a polymer processing aid (PPA) blend partner; and
   forming the polymer mixture into a blown film comprising from 2,000 to 10,000 ppm of the one or more PEGs, and furthermore wherein the blown film is substantially free of fluorine-containing compounds, is substantially free of PEG having weight average molecular weight (Mw) of 10,000 g/mol or greater, and wherein the blown film is such that at 105 minutes of forming the blown film, 0.5% or less of the surface of the blown film (on basis of area of the blown film's surface) contains melt fractures.

2. The method of claim 1, wherein the blown film comprises from 2,000 to 4,000 ppm of the one or more PEGs.

3. The method of claim 1, wherein the PEG masterbatch consists essentially of the one or more PEGs, the carrier resin, and, optionally, one or more additives selected from the group consisting of fillers, antioxidants, phosphites, anti-cling additives, tackifiers, UV stabilizers, heat stabilizers, release agents, anti-static agents, waxes, and combinations thereof.

4. The method of claim 1, wherein the polymer composition comprises a $C_2$ to $C_6$ olefin homopolymer or a copolymer of two or more $C_2$ to $C_{20}$ α-olefins.

5. The method of claim 4, wherein the polymer composition is an ethylene homopolymer or a copolymer of ethylene and one or more $C_3$ to $C_{20}$ α-olefins.

6. The method of claim 5, wherein the polymer composition is a Ziegler-Natta catalyzed copolymer of ethylene and one or more of 1-butene, 1-hexene, and 1-octene.

7. The method of claim 5, wherein the polymer composition is a metallocene catalyzed copolymer of ethylene and one or more of 1-butene, 1-hexene, and 1-octene.

8. The method of claim 1, wherein the carrier resin is selected from the group consisting of mLLDPE, ZN-LLDPE, LDPE, and combinations thereof.

9. The method of claim 1, wherein the carrier resin has melt index (MI) of at least 0.8 g/10 min (190° C., 2.16 kg loading).

10. The method of claim 1, wherein the blown film comprises from 2,000 ppm to 5,000 ppm of the one or more PEGs.

11. The method of claim 1, wherein the PEG masterbatch comprises from 1 to 30 wt % of the one or more PEGs, on the basis of mass of the PEG masterbatch.

12. The method of claim 1, wherein the one or more PEGs of the PEG masterbatch each have Mw within the range from 7,500 to 9,000 g/mol, and furthermore wherein all PEGs in the blown film have Mw within the range from 7,500 to 9,000 g/mol.

13. The method of claim 1, wherein the polymer pellets are either (i) Ziegler-Natta catalyzed copolymer of ethylene and one or more of 1-butene, 1-hexene, and 1-octene produced in a gas phase polymerization process or (ii) metallocene-catalyzed copolymer of ethylene and one or more of 1-butene, 1-hexene, and 1-octene produced in a gas phase polymerization process.

14. A method comprising:
   blending a PEG masterbatch with polymer pellets to obtain a polymer mixture;
   wherein the PEG masterbatch consists essentially of (i) one or more PEGs each having weight-average molecular weight (Mw) within the range from 7,000 to 9,500 g/mol, (ii) a carrier resin, and (iii) optionally, one or more additives selected from the group consisting of fillers, antioxidants, phosphites, anti-cling additives, tackifiers, UV stabilizers, heat stabilizers, release agents, anti-static agents, waxes, and combinations thereof;
   wherein the polymer pellets are pellets of either (a) Ziegler-Natta catalyzed copolymer of ethylene and one or more of 1-butene, 1-hexene, and 1-octene produced in a gas phase polymerization process or (b) metallocene-catalyzed copolymer of ethylene and one or more of 1-butene, 1-hexene, and 1-octene produced in a gas phase polymerization process;
   and further wherein the PEG masterbatch is added to the polymer mixture such that the polymer mixture comprises from 2,000 to 10,000 ppm of the one or more PEGs; and
   forming the polymer mixture into a blown film, wherein the blown film is substantially free of fluorine-containing compounds, is substantially free of PEG having weight average molecular weight (Mw) of 10,000 g/mol or greater, and is such that, at 105 minutes of forming the blown film, 0.5% or less of the surface of the blown film (on basis of area of the blown film's surface) contains melt fractures.

15. The method of claim 14, wherein the carrier resin has melt index (MI) of at least 0.8 g/10 min (190° C., 2.16 kg loading).

16. The method of claim 15, wherein the PEG masterbatch includes the (iii) one or more additives.

17. The method of claim 16, wherein the one or more additives are antiblock and/or slip agents.

18. The method of claim 16, wherein the one or more additives are antiblock agents, slip agents, antioxidants, and/or phosphites.

* * * * *